(12) United States Patent
Kalasibail Seetharam et al.

(10) Patent No.: US 12,598,307 B2
(45) Date of Patent: Apr. 7, 2026

(54) CONSTRAINED OPTIMIZATION TECHNIQUES FOR GENERATING ENCODING LADDERS FOR VIDEO STREAMING

(71) Applicant: NETFLIX, INC., Los Gatos, CA (US)

(72) Inventors: Sagar Bharadwaj Kalasibail Seetharam, Pittsburgh, PA (US); Te-Yuan Huang, Campbell, CA (US); Renata Cruz Teixeira, Palo Alto, CA (US); Xiaoqing Zhu, Austin, TX (US)

(73) Assignee: NETFLIX, INC., Los Gatos, CA (US)

( * ) Notice: Subject to any disclaimer, the term of this patent is extended or adjusted under 35 U.S.C. 154(b) by 229 days.

(21) Appl. No.: 18/154,680

(22) Filed: Jan. 13, 2023

(65) Prior Publication Data

US 2024/0244224 A1    Jul. 18, 2024

(51) Int. Cl.
*H04N 19/146* (2014.01)
*H04N 19/105* (2014.01)

(52) U.S. Cl.
CPC ......... *H04N 19/146* (2014.11); *H04N 19/105* (2014.11)

(58) Field of Classification Search
None
See application file for complete search history.

(56) References Cited

U.S. PATENT DOCUMENTS 10,897,654 B1    1/2021   Wei et al.
11,184,638 B1    11/2021  Sipitca

| 11,277,620 | B1 * | 3/2022 | Liu | H04N 19/184 |
|---|---|---|---|---|
| 11,616,993 | B1 | 3/2023 | Chen et al. | |
| 11,700,376 | B1 * | 7/2023 | Nandakumar | G06F 18/285 |
| | | | | 375/240.02 |
| 11,871,061 | B1 * | 1/2024 | Lin | H04N 21/23439 |
| 2016/0295216 | A1 | 10/2016 | Aaron et al. | |
| 2020/0099733 | A1 * | 3/2020 | Chu | H04N 21/8456 |
| 2021/0360260 | A1 | 11/2021 | Rehman et al. | |
| 2021/0368182 | A1 * | 11/2021 | Pandit | H04N 19/132 |

(Continued)

FOREIGN PATENT DOCUMENTS

WO        2022/173687 A1     8/2022

OTHER PUBLICATIONS

Non Final Office Action received for U.S. Appl. No. 18/154,709 dated Apr. 25, 2024, 17 pages.

(Continued)

*Primary Examiner* — Chikaodili E Anyikire
(74) *Attorney, Agent, or Firm* — Artegis Law Group, LLP

(57)        ABSTRACT

In various embodiments, an encoding ladder application generates encoding ladders that are used to stream media titles. The encoding ladder application generates an objective function based on a ladder configuration and a parameterized objective function. The parameterized objective function approximates a tradeoff between a quality of experience and a cost term associated with a candidate encoding ladder. The encoding ladder application generates constraints based on the ladder configuration and parameterized constraints. The encoding ladder application executes a constrained optimization algorithm on the objective function, the constraints, and encoding point metadata associated with a set of encoded videos to generate a first candidate encoding ladder for a media title.

21 Claims, 6 Drawing Sheets

(56)                References Cited

U.S. PATENT DOCUMENTS

| 2022/0141513 | A1  | 5/2022 | Dai et al.    |            |
| 2022/0159268 | A1* | 5/2022 | Liu ................. | H04N 21/23418 |
| 2022/0256168 | A1  | 8/2022 | Moorthy et al. |           |
| 2024/0106882 | A1* | 3/2024 | Sheldon ............... | H04L 65/612 |

OTHER PUBLICATIONS

International Search Report for Application No. PCT/US2023/085796 dated Apr. 26, 2024.
International Search Report for Application No. PCT/US2023/085804 dated May 13, 2024.
Final Office Action received for U.S. Appl. No. 18/154,709 dated Oct. 18, 2024, 22 pages.
Non Final Office Action received for U.S. Appl. No. 18/154,709 dated Mar. 6, 2025, 20 pages.
Aaron et al., "Per-Title Encode Optimization, Netflix Technology Blog", Dec. 14, 2015, pp. 1-14 https://netflixtechblog.com/per-title-encode-optimization-7e99442b62a2, originally published at techblog.netflix.com.
Katsavounidis et al., "Dynamic optimizer—a perceptual video encoding optimization framework", Netflix Technology Blog, Mar. 5, 2018, pp. 1-23 https://netflixtechblog.com/dynamic-optimizer-a-perceptual-video-encoding-optimization-framework-e19f1e3a277f.
De Cock et al., "Complexity-based Consistent Quality Encoding in the Cloud", IEEE Xplore: Aug. 19, 2016, IEEE International Conference on Image Processing (ICIP), Sep. 25-28, 2016, pp. 1484-1488.
Kah et al., "Fundamental relationships between subjective quality, user acceptance, and the VMAF metric for a quality-based bit rate ladder design for over-the-top video streaming services", SPIE Digital Library, Applications of Digital Image Processing XLIV, Aug. 1, 2021, 17 pages.
Chen et al., "Encoding Bitrate Optimization Using Playback Statistics for HTTP-based Adaptive Video Streaming", Oct. 13, 2017, 8 pages.
Reznik et al., "Optimal Design of Encoding Profiles for ABR Streaming", Jun. 12, 2018, 5 pages.
Notice of Allowance received for U.S. Appl. No. 18/154,709 dated Jul. 1, 2025, 14 pages.

* cited by examiner

500

Partition a source video corresponding to a media title into shots
502

Generate encoded shots based on the shots, any number of resolutions, and any number of sets of values for a set of encoding parameters
504

For each resolution, generate a convex hull of bitrate-quality points based on the encoded shots having the resolution
506

Optionally, normalize the bitrates and the quality scores specified in the bitrate-quality points across all convex hulls to the same range
508

Define a parameterized objective function representing a weighted tradeoff between a weighted average of the quality scores (optionally normalized) across rungs of a candidate encoding ladder and the sum of the bitrates (optionally normalized) across the rungs
510

Define parameterized constraints for candidate encoding ladders
512

Generate one or more different ladder configurations that each specify a different combination of values for a rung count, objective weights, rung quality weights, and constraint parameters
514

For each ladder configuration, generate an objective function and associated constraints based on the parameterized objective function and the parameterized constraints
516

For each objective function, use a constrained optimization solver to generate a different candidate encoding ladder that solves the objective function subject to the associated constraints
518

Store and/or transmit the candidate encoding ladders to any number and/or types of software applications for evaluation and selection of candidate encoding ladder(s) as encoding ladder(s) for the media title
520

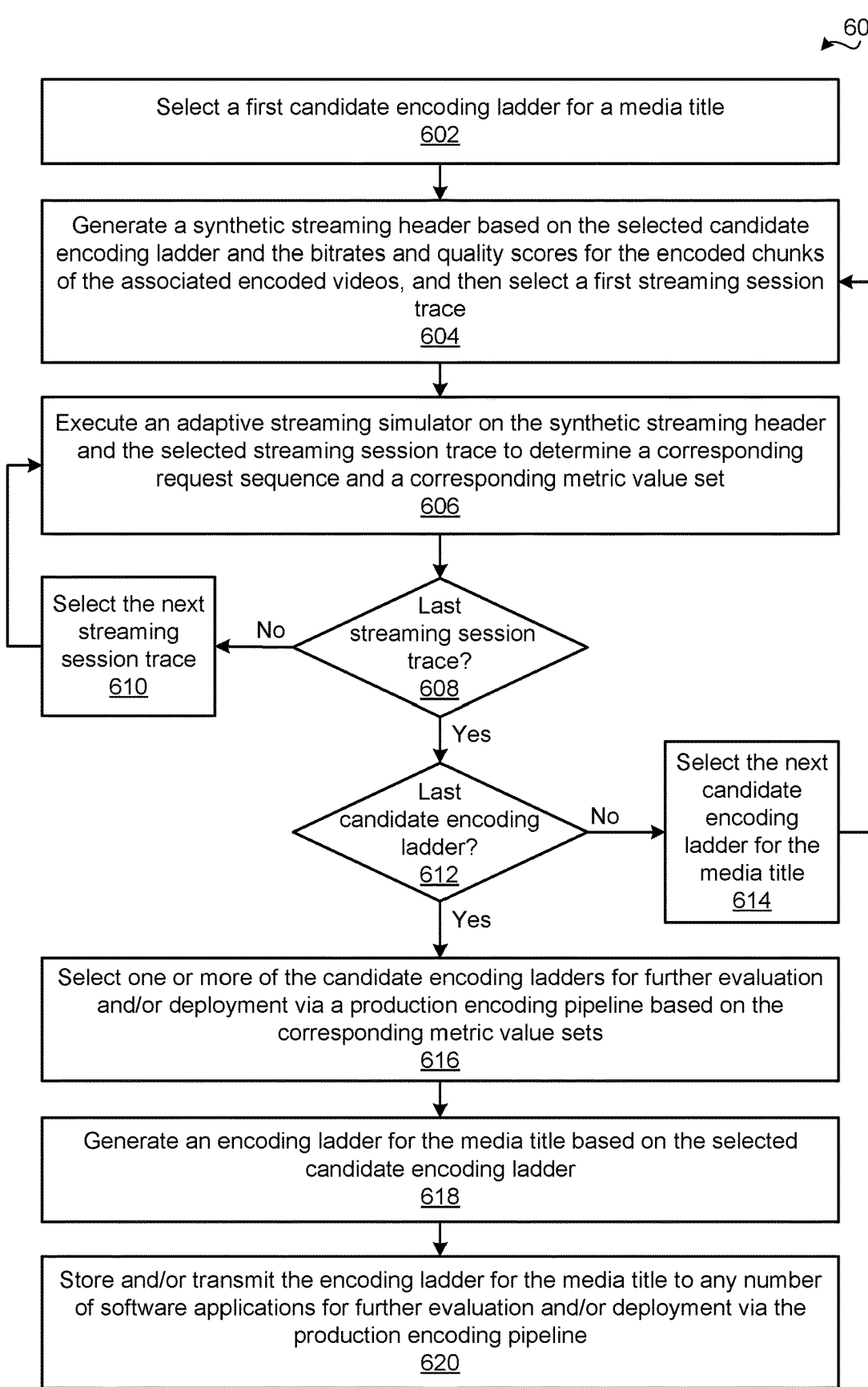

Select a first candidate encoding ladder for a media title
602

Generate a synthetic streaming header based on the selected candidate encoding ladder and the bitrates and quality scores for the encoded chunks of the associated encoded videos, and then select a first streaming session trace
604

Execute an adaptive streaming simulator on the synthetic streaming header and the selected streaming session trace to determine a corresponding request sequence and a corresponding metric value set
606

Select the next streaming session trace
610

No

Last streaming session trace?
608

Yes

Last candidate encoding ladder?
612

No

Select the next candidate encoding ladder for the media title
614

Yes

Select one or more of the candidate encoding ladders for further evaluation and/or deployment via a production encoding pipeline based on the corresponding metric value sets
616

Generate an encoding ladder for the media title based on the selected candidate encoding ladder
618

Store and/or transmit the encoding ladder for the media title to any number of software applications for further evaluation and/or deployment via the production encoding pipeline
620

FIGURE 6

CONSTRAINED OPTIMIZATION TECHNIQUES FOR GENERATING ENCODING LADDERS FOR VIDEO STREAMING

BACKGROUND

Field of the Various Embodiments

The various embodiments relate generally to computer science and to video streaming technology and, more specifically, to constrained optimization techniques for generating encoding ladders for video streaming.

Description of the Related Art

A typical video streaming service provides users with access to a library of media titles that can be viewed on a wide range of different client devices. In operation, a given client device connects to the video streaming service under a variety of connection conditions and, therefore, can be susceptible to differing network throughputs. In an effort to ensure that a given media title can be streamed to a client device without playback interruptions, a video streaming service normally generates an encoding ladder for the media title. Each rung of the encoding ladder specifies a different encoded video for the media title, the resolution of the encoded video, and the bitrate of the encoded video. Notably, an encoded video having a given bitrate can be streamed to a client device without playback interruptions when the network throughput is greater than that bitrate. As the bitrate of an encoded video for a given media title that is streamed to a client device increases, the visual quality of the media title as presented on the client device usually increases as well.

In practice, the encoded videos specified in the encoding ladders for a library of media titles are normally delivered to client devices via a content delivery network (CDN) that has limited storage resources. Accordingly, generating an encoding ladder for a media title usually involves making tradeoffs between a streaming QoE associated with the encoding ladder and a storage footprint of the encoding ladder. As used herein, a "streaming QoE" associated with an encoding ladder for a media title refers to an overall QoE for viewers when the encoding ladder is used to stream the media title to client devices. In practice, the streaming QoE usually correlates to the overall visual quality of the media title as streamed to and presented on client devices. A "storage footprint" for an encoding ladder refers to the total size of the encoded videos specified in the encoding ladder.

In one approach to generating an encoding ladder for a media title, the encoding ladder is incrementally constructed based on heuristics corresponding to a set of ladder constraints. Collectively, the ladder constraints are designed to ensure that requisite streaming QoEs can be achieved when the media title is transmitted to a variety of client devices over networks having a wide range of throughputs. To generate a given encoding ladder for a media title, a relatively large number of different encoded videos representing many different combinations of resolution and bitrate are produced based on a source video of the media title. Starting from an initially empty encoding ladder, the heuristic for each ladder constraint is sequentially executed on the encoding ladder based on the different encoded videos, where the heuristic for a given ladder constraint determines whether the encoding ladder already complies with the ladder constraint. If the encoding ladder already complies with the ladder constraint, then the heuristic does not modify the encoding ladder. Otherwise, the heuristic adds at least one encoded video to the encoding ladder in order to bring the encoding ladder into compliance with that particular ladder constraint.

One drawback of the above approach is that, because the ladder constraints are enforced one-at-a-time, and no encoded video is ever removed from the encoding ladder, the streaming QoE/storage footprint represented by the encoding ladder can be sub-optimal. More specifically, because ladder constraints are enforced sequentially, opportunities to intentionally select a single encoded video that satisfies multiple ladder constraints in order to improve the streaming QoE/storage footprint tradeoff are missed. In such cases, the streaming QoE of the media title can be unnecessarily low, meaning that the average visual quality of the media title achieved using the encoded videos specified in the encoding ladder is too low given the storage footprint of the encoding ladder. Conversely, the storage footprint of the encoding ladder can be unnecessarily large, meaning that the size of the storage footprint of the encoding ladder is too large given the average visual quality of the media title achieved using the encoded videos specified in the encoding ladder. When this issue exists, the CDN storage resources could be more efficiently utilized by taking advantage of opportunities to satisfy multiple ladder constraints via a single encoded video to generate an improved encoding ladder for the media title. The improved encoding ladder would have a reduced storage footprint and would provide the same or higher streaming QoE.

As the foregoing illustrates, what is needed in the art are more effective techniques for generating encoding ladders for video streaming.

SUMMARY

One embodiment sets forth a computer-implemented method for generating encoding ladders that are used to stream media titles. The method includes generating a first objective function based on a first ladder configuration and a parameterized objective function that approximates a tradeoff between a quality of experience and a cost term associated with a candidate encoding ladder; generating a first set of constraints based on the first ladder configuration and a set of parameterized constraints; and executing a constrained optimization algorithm on the first objective function, the first set of constraints, and encoding point metadata associated with a set of encoded videos to generate a first candidate encoding ladder for a media title.

At least one technical advantage of the disclosed techniques relative to the prior art is that, with the disclosed techniques, encoding ladders can be generated based on an overall objective of reducing the storage footprint of an encoding ladder while increasing the visual quality levels associated with the encoded videos included in the encoding ladder by concurrently accounting for different ladder constraints when generating the encoding ladder in the first instance. With such an approach, opportunities to use a single encoded video that satisfies multiple different ladder constraints can be identified and exploited when generating an encoding ladder, which improves the tradeoff between the weighted average of the visual quality levels associated with the encoded videos in the encoding ladder and the storage footprint of the encoding ladder. Consequently, the tradeoff between a streaming quality of experience represented by an encoding ladder for a given media title and the storage footprint of the encoding ladder can be substantially improved relative to what can be achieved using prior art techniques. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 5 is a flow diagram of method steps for generating candidate encoding ladders for use when streaming a media title, according to various embodiments; and FIG. 6 is a flow diagram of method steps for determining an encoding ladder for a media title based on adaptive streaming simulations of candidate encoding ladders that have been generated for the media title, according to various embodiments.

DETAILED DESCRIPTION

Figure 1:
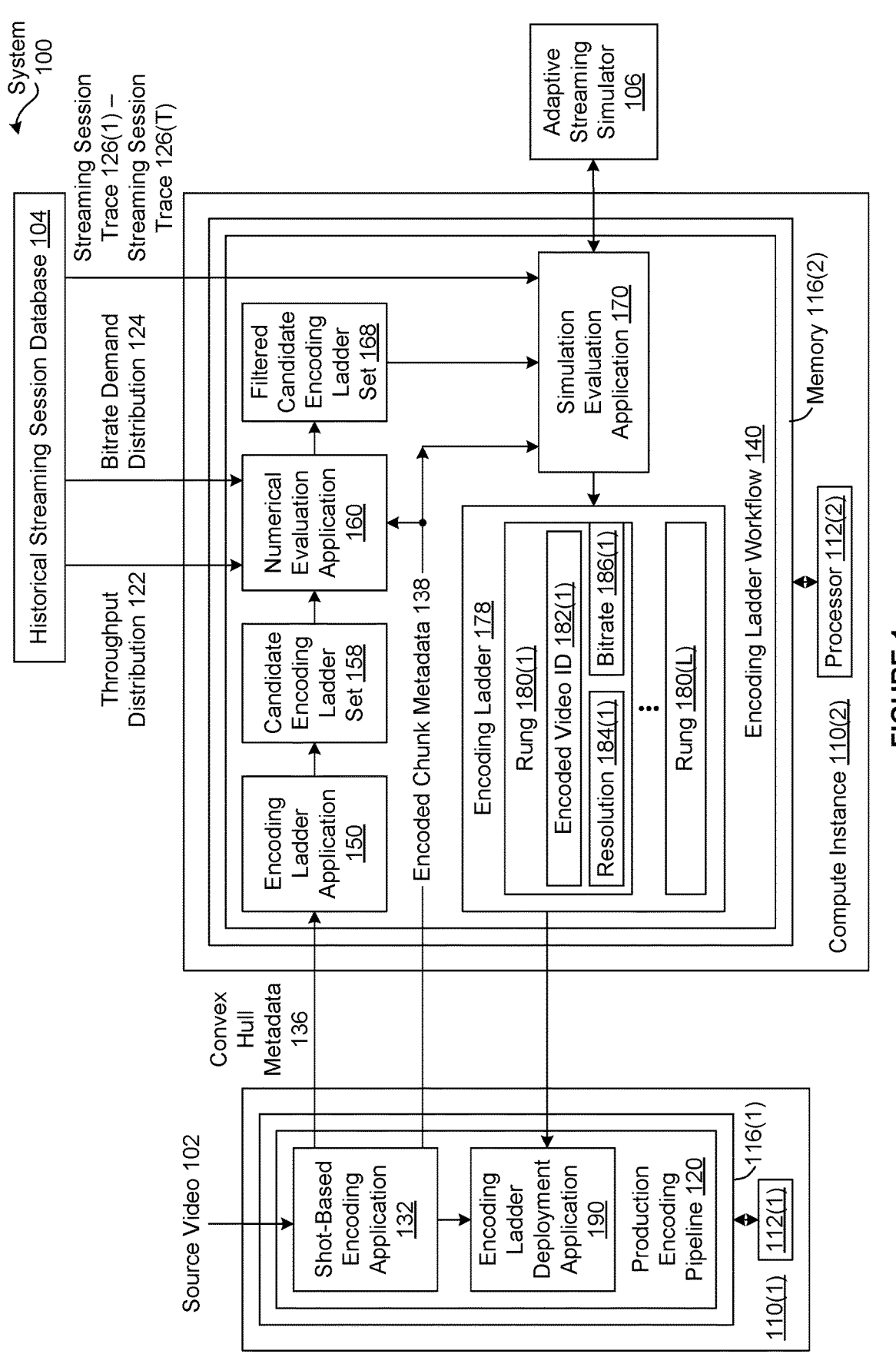
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details. For explanatory purposes, multiple instances of like objects are symbolized with reference numbers identifying the object and parenthetical alphanumeric character(s) identifying the instance where needed.

In an effort to ensure that a given media title can be streamed to a client device without playback interruptions, a video streaming service normally generates an encoding ladder for the media title. Each rung of the encoding ladder specifies a different encoded video for the media title, the resolution of the encoded video, and the bitrate of the encoded video. Notably, an encoded video having a given bitrate can be streamed to a client device without playback interruptions when the available network bandwidth is greater than that bitrate. As the bitrate of an encoded video for a given media title that is streamed to a client device increases, the visual quality of the media title as presented on the client device usually increases as well.

In practice, the encoded videos specified in the encoding ladders for a library of media titles are normally partitioned into encoded chunks, and the resulting encoded chunks are delivered to client devices via a CDN. To playback a given media title, a client device executes an endpoint application. Oftentimes, the endpoint application implements an adaptive bitrate algorithm that selects from the different encoded videos specified in the encoding ladder for the media title based on the network throughput and optionally the resolution of an associated screen. The endpoint application transmits a sequence of requests for chunks of the selected encoded video to an edge server device that is included in the CDN and resides relatively close to the client device. As the various encoded chunks are received by the endpoint application, the endpoint application decodes and, when necessary, upscales the encoded chunks to generate reconstructed chunks having the same resolution as the associated screen. The endpoint application plays back the different reconstructed chunks, thereby playing back the media title on the client device.

Because CDNs have limited storage resources, generating an encoding ladder for a media title usually involves making tradeoffs between a streaming QoE associated with the encoding ladder and a storage footprint of the encoding ladder. As used herein, the "streaming QoE" associated with an encoding ladder refers to an average QoE of viewers of a media title that has been encoded and streamed to client devices. The streaming QoE reflects both visual quality levels associated with the encoded chunks used for streaming and the impact of any re-buffering events or other events that result in playback interruptions on the overall quality of the viewing experience. A "storage footprint" for an encoding ladder refers to the total size of the encoded videos specified in the encoding ladder.

In one approach to generating an encoding ladder for a media title, the encoding ladder is incrementally constructed based on heuristics corresponding to a set of ladder constraints. The ladder constraints are designed to ensure that requisite streaming QoEs can be achieved when the media title is transmitted to a wide range of client devices over networks having variable and different throughputs to enable viewing of the media title on screens having different resolutions. To generate an encoding ladder, different encoded videos representing many different combinations of resolution and bitrate are produced based on a source video of the media title. Starting from an initially empty ladder, the heuristic corresponding to each ladder constraint is sequentially applied to the ladder. If the encoding ladder already complies with the ladder constraint, then the heuristic does not modify the encoding ladder. Otherwise, the heuristic adds at least one of the encoded videos to the encoding ladder in order to bring the encoding ladder into compliance with that particular ladder constraint.

One drawback of the above approach is that, because the ladder constraints are enforced one-at-a-time, and no encoded video is ever removed from the encoding ladder, the streaming QoE/storage footprint represented by the encoding ladder can be sub-optimal. In particular, because ladder constraints are enforced sequentially, opportunities to intentionally select a single encoded video that satisfies multiple ladder constraints in order to improve the streaming QoE/storage footprint tradeoff are missed. In such cases, the size of the storage footprint of the encoding ladder is unnecessarily large given the average visual quality of the media title achieved using the encoded videos specified in the encoding ladder. Consequently, CDN storage resources are squandered.

With the disclosed techniques, however, an encoding ladder application generates one or more candidate encoding ladders for a media title based on an explicit goal of increasing streaming QoE while decreasing one or more costs (such as the storage footprint) and concurrently satisfying the ladder constraints. In some embodiments, an encoding ladder workflow executes the encoding ladder application to generate multiple candidate optimized ladders. The encoding ladder workflow then uses a numerical evaluation application and a simulation evaluation application to determine a final encoding ladder for the media title.

The encoding ladder application formulates the problem of generating an encoding ladder as a parameterized constrained optimization problem of assigning bitrate-quality points to rungs of a candidate encoding ladder. The encoding ladder application determines the constants of the parameterized constraint optimization problem based on bitrate-quality points that are generated based on a source video associated with the media title. Each bitrate-quality point specifies a different encoded video derived from the source video and the corresponding resolution, bitrate, and visual quality score. Because bitrates and visual quality scores associated with encoded videos usually, if not always, have different magnitudes, the encoding ladder application optionally normalizes the bitrates and visual quality scores of the bitrate-quality points to the same range.

The encoding ladder application defines the objective and constraints of the parameterized constrained optimization problem via a parameterized objective function and parameterized constraints. The parameterized objective function represents a weighted tradeoff between a quality term that approximates a streaming QoE represented by a candidate encoding ladder and a footprint term that is proportional to the storage footprint of the candidate encoding ladder. The quality term is a weighted average of normalized visual quality scores across rungs of the candidate encoding ladder. The footprint term is the sum of normalized bitrates across the rungs. The number of rungs and the weights are parameters of the parameterized objective function. The parameterized constraints include both implicit logic constraints and practical logical constraints. Implicit logic constraints ensure the validity of candidate encoding ladders. Practical logical constraints capture operational restrictions and/or preferences that are associated with capabilities of client devices, network capacity, a CDN, human perception of visual quality, etc.

The encoding ladder application generates multiple ladder configurations, where each ladder configuration is a different combination of values for the number of rungs, the weights, and various parameters of the parameterized constraints (e.g., a relative bitrate spacing). For each ladder configuration, the encoding ladder application generates an objective function and associated constraints based on the parameterized objective function and the parameterized constraints, respectively. The encoding ladder application uses a constrained optimization algorithm to solve each of the objective functions subject to the associated constraints, thereby generating a different assignment matrix for each ladder configuration. Each assignment matrix specifies a different assignment of bitrate-quality points to each rung of a different candidate encoding ladder.

The numerical evaluation application performs numerical evaluations of the candidate encoding ladders using statistical data (e.g., throughput distributions, bitrate demand distributions) derived from historical streaming sessions. In some embodiments, the numerical evaluation application filters out any number (including zero) of candidate encoding ladders representing sub-par tradeoffs between streaming QoE and storage footprint.

In some other embodiments, the numerical evaluation application can estimate any number and/or types of streaming QoE metrics in any technically feasible fashion. Some examples of other streaming QoE metrics are time-weighted visual quality, time-weighted bitrate, percentage of a predefined "excellent" quality, percentage of a predefined "low" quality, and probability of re-buffering. In the same or other embodiments, the numerical evaluation application can filter-out any number (including zero) of candidate encoding ladders based on tradeoffs across multiple dimensions, such as tradeoffs between expected streaming QoE, storage footprint, and network bandwidth consumption.

The streaming evaluation application performs simulation-based evaluations of the remaining (e.g., unfiltered) candidate encoding ladders. For each of the remaining candidate encoding ladders, the streaming evaluation application generates a different synthetic streaming header based on the encoded videos specified in the candidate encoding ladder. For each encoded video specified in a given candidate encoding ladder, the corresponding synthetic streaming header specifies the encoded video, the resolution of the encoded video, the bitrate of the encoded video, a corresponding sequence of encoded chunks, a bitrate for each of the encoded chunks, and a visual quality score for each of the encoded chunks.

The streaming evaluation application uses an adaptive streaming simulator to emulate the behavior of an adaptive bitrate algorithm using each of the candidate encoding ladders and the corresponding encoded chunk metadata over multiple simulated streaming sessions characterized by different streaming session traces. Each streaming session trace specifies network throughput as a function of time for a different historical streaming session. The result of each simulation is a request sequence of encoded chunks of the media title. For each request sequence, the streaming evaluation application computes a different set of values for a set of metrics that are relevant to streaming QoE. The streaming evaluation application performs any number and/or types of comparison operations between the sets of values for the set of metrics to select one of the remaining candidate encoding ladders. The streaming evaluation application generates an encoding ladder for the media title based on the selected candidate encoding ladder.

At least one technical advantage of the disclosed techniques relative to the prior art is that, with the disclosed techniques, the encoding ladder application concurrently satisfies ladder constraints while explicitly optimizing an approximate streaming QoE/storage footprint tradeoff to generate each candidate encoding ladder. Unlike prior art techniques, the encoding ladder application therefore automatically identifies and exploits opportunities to use a single encoded video to satisfy multiple different ladder constraints and improve the streaming QoE/storage footprint tradeoff. Consequently, the streaming QoE/storage footprint tradeoff represented by a candidate encoding ladder for a given media title can be substantially improved relative to what can be achieved using prior art techniques. Another advantage of the disclosed techniques is that the simulation evaluation application can efficiently compare the performance of a significantly larger number of candidate encoding ladders using less time, processing resources, and network resources than would be required to deploy and evaluate the candidate encoding ladders over actual networks. These technical advantages provide one or more technological improvements over prior art approaches.

FIG. 1 is a conceptual illustration of a system 100 configured to implement one or more aspects of the various embodiments. For explanatory purposes, multiple instances or versions of like objects are denoted with reference numbers identifying the object and parenthetical alphanumeric character(s) identifying the instance or version where needed. As shown, in some embodiments, the system 100 includes, without limitation, a compute instance 110(1), a compute instance 110(2), a historical streaming session database 104, and an adaptive streaming simulator 106.

In some other embodiments, the system 100 can omit the compute instance 110(1), the compute instance 110(2), the historical streaming session database 104, the adaptive streaming simulator 106, or any combination thereof. In the same or other embodiments, the system 100 can include, without limitation, one or more other compute instances, one or more other historical streaming session databases, or any combination thereof. The components of the system 100 can be distributed across any number of shared geographic locations and/or any number of different geographic locations and/or implemented in one or more cloud computing environments (i.e., encapsulated shared resources, software, data, etc.) in any combination.

As shown, the compute instance 110(1) includes, without limitation, a processor 112(1) and a memory 116(1), and the compute instance 110(2) includes, without limitation, a processor 112(2) and a memory 116(2). The compute instance 110(1) and the compute instance 110(2) are also referred to herein individually as "the compute instance 110" and collectively as "the compute instances 110." The processor 112(1) and the processor 112(2) are also referred to herein individually as "the processor 112" and collectively as "the processors 112." The memory 116(1) and the memory 116(2) are also referred to herein individually as "the memory 116" and collectively as "the memories 116." Each compute instance (including the compute instances 110) can be implemented in a cloud computing environment, implemented as part of any other distributed computing environment, or implemented in a stand-alone fashion.

The processor 112 can be any instruction execution system, apparatus, or device capable of executing instructions. For example, the processor 112 could comprise a central processing unit, a graphics processing unit, a controller, a micro-controller, a state machine, or any combination thereof. The memory 116 of the compute instance 110 stores content, such as software applications and data, for use by the processor 112 of the compute instance 110. The memory 116 can be one or more of a readily available memory, such as random-access memory, read only memory, floppy disk, hard disk, or any other form of digital storage, local or remote.

In some other embodiments, any number of compute instances can include any number of processors and any number of memories in any combination. In particular, the compute instance 110(1), the compute instance 110(2), any number of other compute instances, or any combination thereof can provide a multiprocessing environment in any technically feasible fashion.

In some embodiments, a storage (not shown) may supplement or replace the memory 116 of the compute instance 110. The storage may include any number and type of external memories that are accessible to the processor 112 of the compute instance 110. For example, and without limitation, the storage can include a Secure Digital Card, an external Flash memory, a portable compact disc read-only memory, an optical storage device, a magnetic storage device, or any suitable combination of the foregoing In general, each compute instance (including the compute instances 110) is configured to implement one or more software applications. For explanatory purposes only, each software application is described as residing in the memory 116 of a single compute instance and executing on the processor 112 of the same compute instance. However, in some embodiments, the functionality of each software application can be distributed across any number of other software applications that reside in the memories of any number of compute instances and execute on the processors of any number of compute instances in any combination. Further, the functionality of any number of software applications can be consolidated into a single software application.

In particular, in some embodiments, a production encoding pipeline 120 resides in the memory 116(1) of the compute instance 110(1) and executes on the processor 112(1) of the compute instance 110(1). As shown, the production encoding pipeline 120 includes, without limitation, a shot-based encoding application 132 and a ladder deployment application 190.

The shot-based encoding application 132 partitions a source video 102 into shots (not shown). The source video 102 includes, without limitation, any amount and/or types of video content. Some examples of video content include, without limitation, any portion (including all) of feature length films, episodes of television programs, and music videos, to name a few. Each shot includes a sequence of frames that usually have similar spatial-temporal properties and run for an uninterrupted period of time. In some embodiments, each shot is captured continuously from a single camera or virtual representation of a camera (eg, in the case of computer animated videos). Together, the shots span the length of the source video 102 in a contiguous, non-overlapping fashion.

The shot-based encoding application 132 downscales each of the shots to multiple different resolutions to generate lower-resolution shots. The shot-based encoding application 132 encodes each of the shots and each of the lower-resolution shots across different sets of one or more values for a set of one or more encoding parameters to generate encoded shots having different combinations of resolutions and bitrates. The shot-based encoding application 132 computes the bitrate encoded shot and a quality score for each encoded shot.

As used herein, the bitrate of an encoded sequence of frames (e.g., an encoded shot or an encoded video) refers to an average bitrate across the encoded sequence of frames. The quality score of an encoded sequence of frames refers to a quality score of a reconstructed sequence of frames derived from the encoded sequence of frames. And the quality score of a reconstructed sequence of frames refers to an average estimated visual quality level across the reconstructed sequence of frames.

A quality score can be a value for any type of metric that correlates to visual quality in any technically feasible fashion. In some embodiments, each quality score is a value for a visual quality metric. Some examples of visual quality metrics include, without limitation, a peak signal-to-noise-ratio (PSNR), and a video multimethod assessment fusion (VMAF) metric. The VMAF metric estimates human-perceived video quality of reconstructed video content (e.g., the reconstructed shots, reconstructed videos, etc.).

For each resolution, the shot-based encoding application 132 generates a convex hull (not shown) of bitrate-quality points based on the encoded shots having that resolution. Subsequently, the shot-based encoding application 132 sets convex hull metadata 136 equal to a union of the bitrate-quality points included in the convex hulls for the different resolutions. The convex hull metadata 136 facilitates the generation of an encoding ladder for the media title.

The shot-based encoding application 132 partitions the source video 102 into any number of source chunks, where each source chunk includes a sequence of one or more shots.

Each of the source chunks defines a portion of the media title that is to be independently requested by and transmitted to client devices during streaming of the media title. Together, the chunks span the length of the source video 102 in a contiguous, non-overlapping fashion.

The shot-based encoding application 132 determines the encoded chunks of each encoded video that is specified (via a corresponding encoded video ID) in at least one of the bitrate-quality points included in the convex hull metadata 136 based on the source chunks and the encoded shots. The shot-based encoding application 132 computes the bitrate and quality score for each of the encoded chunks of each encoded video specified in the convex hull metadata 136 to generate encoded chunk metadata 138.

The ladder deployment application 190 transmits the encoded chunks specified in the encoding ladder for the media title to a CDN (not shown) for subsequent delivery from any number of server devices in the CDN to any number of client devices (not shown). The ladder deployment application 190 also transmits the encoding ladder for the media title to a playback server (not shown) that subsequently enables client devices to request encoded chunks from a proximate server in the CDN based on the encoding ladder and an available network throughput to affect streaming of the media title.

As described previously herein, in one conventional approach to generating an encoding ladder for a media title, the encoding ladder is incrementally constructed based on heuristics corresponding to a set of ladder constraints and encoded videos representing many different combinations of resolution and bitrate. The heuristic for each ladder constraint is sequentially executed on an initially empty encoding ladder based on the different encoded videos, where the heuristic for a given ladder constraint determines whether the encoding ladder already complies with the ladder constraint. If the encoding ladder already complies with the ladder constraint, then the heuristic does not modify the encoding ladder. Otherwise, the heuristic adds at least one encoded video to the encoding ladder in order to bring the encoding ladder into compliance with that particular ladder constraint.

One drawback of the above approach is that, because the ladder constraints are enforced one-at-a-time, and no encoded video is ever removed from the encoding ladder, opportunities to intentionally select a single encoded video that satisfies multiple ladder constraints in order to improve the streaming QoE/storage footprint tradeoff represented by the encoding ladder can be missed. When such opportunities are missed, CDN storage resources could be more efficiently utilized by using an improved encoding ladder that would have a reduced storage footprint and would provide the same or higher streaming QoE.

Generating Encoding Ladders Using Constrained Optimization Techniques

To address the above problem, the system 100 includes, without limitation, an encoding ladder workflow 140 that uses constrained optimization techniques to generate an encoding ladder 178 for the media title associated with the source video 102. As shown, in some embodiments, the encoding ladder 178 includes, without limitation, a rung 180(1)—a rung 180(L), where L can be any positive integer. The rung 180(1) specifies an encoded video ID 182(1), a resolution 184(1), and a bitrate 186(1). The encoded video ID 182(1) identifies an encoded video for the source video 102. The resolution 184(1) and the bitrate 186(1) specify the resolution and the bitrate of the encoded video corresponding to the encoded video ID 182(1).

The encoding ladder workflow 140 includes, without limitation, an encoding ladder application 150, a numerical evaluation application 160, and a simulation evaluation application 170. As shown, in some embodiments, the encoding ladder workflow 140, the encoding ladder application 150, the numerical evaluation application 160, and the simulation evaluation application 170 reside in the memory 116(2) of the compute instance 110(2) and execute on the processor 112(2) of the compute instance 110(2).

As shown, the encoding ladder application 150 generates a candidate encoding ladder set 158 for the media title corresponding to the source video 102 based on the convex hull metadata 136. The candidate encoding ladder set 158 includes one or more candidate encoding ladders (not shown in FIG. 1) for the media title. As used herein, a "candidate encoding ladder" for a media title refers to any encoding ladder that can be used as an encoding ladder for the media title. The encoding ladder application 150 formulates the problem of encoding ladder generation as one or more different constrained optimization problems based on the convex hull metadata 136.

Each constrained optimization problem represents an overall objective of reducing the storage footprint of an encoding ladder while increasing the streaming QoE associated with the encoding ladder subject to an associated set of constraints. The importance of reducing the storage footprint of a candidate encoding ladder relative to increasing QoE associated with the candidate encoding ladder and/or the set of constraints vary across the constrained optimization problems. The encoding ladder application 150 independently solves each constrained optimization problem to generate a different candidate encoding ladder in the candidate encoding ladder set 158. The encoding ladder application 150 is described in greater detail below in conjunction with FIG. 2.

The numerical evaluation application 160 performs any number and/or types of numerical evaluations on the candidate encoding ladder set 158 based on the historical streaming session database 104. The historical streaming session database 104 includes, recorded data associated with any number of past streaming sessions and any amount (including none) of data derived from the recorded data. In particular, the numerical evaluation application 160 uses a throughput distribution 122 and/or a bitrate demand distribution 124 derived from recorded data associated with any number of past streaming sessions represented by the historical streaming session database 104 to perform numerical evaluations on each of the candidate encoding ladders included in the candidate encoding ladder set 158. Based on the results of the numerical evaluations, the numerical evaluation application 160 selects any number (including none) of the candidate encoding ladders from the candidate encoding ladder set 158 that represent sub-par tradeoffs between expected streaming QoE and storage footprint. The numerical evaluation application 160 then filters out (e.g., removes) any selected candidate encoding ladders from the candidate encoding ladder set 158 to generate a filtered candidate encoding ladder set 168.

As shown, in some embodiments, the simulation evaluation application 170 performs any number and/or types of simulation-based evaluations on the filtered candidate encoding ladder set 168 based on the encoded chunks metadata 138 and the historical streaming session database 104. For each of the candidate encoding ladders in the filtered candidate encoding ladder set 168, the simulation evaluation application 170 performs T different simulations using the candidate encoding ladder and a streaming session trace 126(1)—a streaming session trace 126(T), where T can be any positive integer.

For explanatory purposes, the streaming session trace 126(1)—a streaming session trace 126(T) are also referred to herein individually as a "streaming session trace 126" and collectively as "streaming session traces 126." Each of the streaming session traces 126 includes recorded measurements of one or more characteristics of a network over a period of time or synthesized measurements of one or more network characteristics over a period of time.

In some embodiments, each of the streaming session traces 126 is network throughput trace that indicates a network throughput as a function of time over the duration of the trace. In some embodiments, including the embodiment depicted in FIG. 1, each of the streaming session traces 126 is a recorded network throughput trace that specifies recorded measurements of the throughput of an actual network. In some alternative embodiments, each of the streaming session traces 126 is a synthesized network throughput trace that is generated by a software application (e.g., the simulation evaluation application 170) in any technically feasible fashion.

In some embodiments, to perform a simulation for a candidate encoding ladder using the streaming session trace 126(t), where t can be any integer from 1 through T, the simulation evaluation application 170 transmits the candidate encoding ladder and streaming session trace 126(t) to the adaptive streaming simulator 106. In response, the adaptive streaming simulator 106 executes an adaptive bitrate (ABR) algorithm based on the candidate encoding ladder over a simulated streaming session that is characterized by the streaming session trace 126(t). Over the simulated streaming session, the ABR algorithm attempts to select a sequence of encoded chunks having the highest bitrates possible without exceeding the available network throughput.

For each of the simulations, the simulation evaluation application 170 computes a set of values for a set of metrics referred to herein as a "streaming evaluation metric set." The simulation evaluation application 170 performs any number and/or types of evaluations and/or comparisons between the sets of values to select any number of the associated candidate encoding ladders for further evaluation and/or deployment via the production encoding pipeline 120.

In some embodiments, including the embodiment depicted in FIG. 1, the simulation evaluation application 170 selects a single candidate encoding ladder for deployment via the production encoding pipeline 120. The simulation evaluation application 170 generates the encoding ladder 178 based on the selected candidate encoding ladder and then transmits the encoding ladder 178 to the ladder deployment application 190 included in the production encoding pipeline 120. The simulation evaluation application 170 is described in greater detail below in conjunction with FIG. 4.

Advantageously, because the encoding ladder application 150 formulates the encoding ladder generation problem as a constrained optimization problem, the encoding ladder application 150 concurrently accounts for different ladder constraints when generating the candidate encoding ladders included in the candidate encoding ladder set 158. As a result, the encoding ladder application 150 automatically identifies and exploits opportunities to use a single encoded video that satisfies multiple different ladder constraints when generating each candidate encoding ladder. Relative to an encoding ladder for a media title generated using prior-art approaches, the encoding ladder application 150 can therefore generate a candidate encoding ladder for the media title that is associated with a reduced storage footprint and the same or better streaming QoE. And, unlike prior-art techniques, each objective function explicitly represents a streaming QoE/storage footprint tradeoff. Relative to an encoding ladder for a media title generated using prior-art approaches, the encoding ladder application 150 can therefore generate a candidate encoding ladder for a media title that is associated with the same or smaller storage footprint and a better streaming QoE.

As persons skilled in the art will recognize, typical prior-art approaches to comparing streaming QoEs achieved using different encoding ladders for a media title over different network conditions involve A/B testing. Usually, because A/B testing is time-consuming and consumes significant amounts of processing and network resources, only a relatively small number of encoding ladders for a media title are compared using A/B testing. Advantageously, the simulation evaluation application 170 can efficiently compare the performance of a significantly larger number of candidate encoding ladders and/or encoding ladders over a significantly larger number of network throughput traces using less time, processing resources, and network resources. Relative to prior-art techniques, because the simulation evaluation application 170 can more efficiently and widely evaluate a space of possible encoding ladders, the simulation evaluation application 170 can generate an encoding ladder representing a better streaming QoE/footprint tradeoff.

Note that the techniques described herein are illustrative rather than restrictive and may be altered without departing from the broader spirit and scope of the invention. Many modifications and variations on the functionality provided by the encoding ladder application 150, the numerical evaluation application 160, the simulation evaluation application 170, the encoding ladder workflow 140, the shot-based encoding application 132, the ladder deployment application 190, the production encoding pipeline 120, and the adaptive streaming simulator 106 will be apparent to those of ordinary skill in the art without departing from the scope and spirit of the described embodiments. In some embodiments, the inventive concepts described herein in the context of the encoding ladder application 150 can be practiced without any of the other inventive concepts described herein. In some embodiments, the inventive concepts described herein in the context of the simulation evaluation application 170 can be practiced without any of the other inventive concepts described herein. In the same or other embodiments, the simulation evaluation application 170 can use one or more ABR algorithms to evaluate any number of candidate encoding ladders to use when streaming the media title associated with the source video 102.

In some embodiments, the encoding ladder application 150 can incorporate any number and/or types of objective functions, where each objective function attempts to maximize streaming QoE while minimizing one or more cost terms. As used herein, a "cost term" is a portion of an objective function that is to be reduced when solving a constrained optimization problem and is associated with (e.g., computed based on) any number and/or types of costs. In some embodiments, the footprint term 324 is a cost term of the objective function 340. A "cost" can be any characteristic, metric, etc., associated with transmitting encoded videos to a client device over any number and/or types of network connections. Two examples of costs are a storage footprint of an encoding ladder and network bandwidth consumption.

In some alternate embodiments, any amount (including none or all) of the convex hull metadata 136 and/or the encoded chunk metadata 138 can be derived from encoded videos and any remaining amount (including none or all) of the convex hull metadata 136 and/or the encoded chunk metadata 138 can be estimated for "virtual" encoded videos, and the techniques described herein are modified accordingly. Metadata estimated for a "virtual encoded video" refers herein to metadata that is estimated for an encoded video that could potentially be generated based on the source video 102. Any amount and/or types of metadata can be estimated for virtual encoded videos in any technically feasible fashion. For instance, in some embodiments, the production encoding pipeline 120 and/or the encoding ladder application 150 estimates metadata for a virtual encoded video based on a curve. In the same or other embodiments, the production encoding pipeline 120 and/or the encoding ladder application 150 performs any number and/or types of extrapolation operations and/or interpolation operations on metadata associated with one or more encoded versions of the source video 102 to estimate metadata for a virtual encoded video that could potentially be generated from the source video 102. For explanatory purposes, as used herein, metadata of an encoded video can refer to either metadata derived from an encoded version of a video or metadata estimated for a virtual encoded video. For example, a bitrate and a quality score of an encoded video can refer to a bitrate and a quality score that is estimated for a virtual encoded video based on the source video 102 and/or zero or more encoded versions of the source video 102.

Many modifications and variations on the organization, amount, and/or types of data described herein will be apparent to those of ordinary skill in the art without departing from the scope and spirit of the described embodiments. For instance, in some embodiments, each rung of the encoding ladder 178 can specify a quality score in addition to the bitrate and the resolution of the encoded video specified via the encoded video ID.

It will be appreciated that the system 100 shown herein is illustrative and that variations and modifications are possible. For instance, the connection topology between the various components in FIG. 1 may be modified as desired. For example, in some embodiments, one or more of the production encoding pipeline 120, the numerical evaluation application 160, the simulation evaluation application 170, or the encoding ladder workflow 140 are omitted from the system 100, and the encoding ladder application 150 generates and/or obtains the encoded chunk metadata 138 in any technically feasible fashion.

Figure 2:
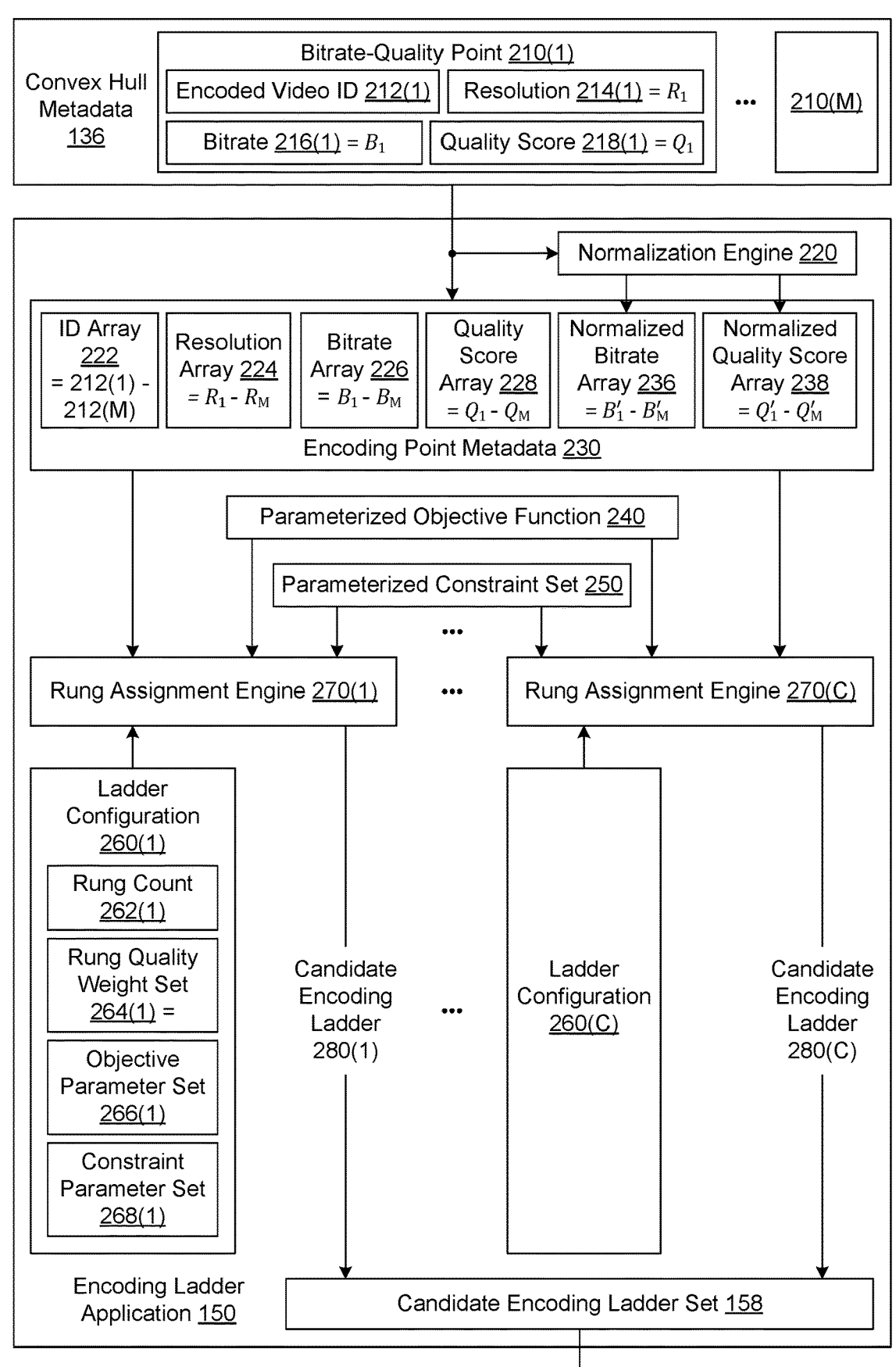
FIG. 2 is a more detailed illustration of the encoding ladder application of FIG. 1, according to various embodiments.

FIG. 2 is a more detailed illustration of the encoding ladder application 150 of FIG. 1, according to various embodiments. As described previously herein in conjunction with FIG. 1, the encoding ladder application 150 generates a candidate encoding ladder set 158 based on the convex hull metadata 136. The candidate encoding ladder set 158 includes a candidate encoding ladder 280(1)—a candidate encoding ladder 280(C), where C can be any positive integer. Each of the candidate encoding ladder 280(1)—the candidate encoding ladder 280(C) can be used as an encoding ladder for the media title associated with the convex hull metadata 136.

As shown, the convex hull metadata 136 includes, without limitation, a bitrate-quality point 210(1)—a bitrate-quality point 210(M), where M can be any positive integer. As described previously herein in conjunction with FIG. 1, each of the bitrate-quality point 210(1)—the bitrate-quality point 210(M) represents a different encoded video that is generated based on the shots included in the source video 102. For explanatory purposes, the bitrate-quality point 210(1)—a bitrate-quality point 210(M) are also referred to herein individually as a "bitrate-quality point 210" and collectively as "bitrate-quality points 210."

As shown, the bitrate-quality point 210(1) includes, without limitation, an encoded video ID 212(1), a resolution 214(1), a bitrate 216(1), and a quality score 218(1). The encoded video ID 212(1) identifies an encoded video that is generated or can be generated based on the shots included in the source video 102. If the encoded video ID 212(1) identifies an encoded video that is already generated, then the resolution 214(1), the bitrate 216(1), and the quality score 218(1) specify the resolution, the bitrate, and the quality score (e.g., a value for a VMAF metric) of the encoded video. Otherwise, the resolution, the bitrate 216(1), and the quality score 218(1) specify the resolution, an estimated average bitrate, and an estimated quality score for an encoded video that can be generated as per the encoded video ID 212(1). As depicted in italics, the resolution 214(1), the bitrate 216(1), and the quality score 218(1) are also symbolized herein as $R_1$, $B_1$, and $Q_1$, respectively.

Although not shown, for an integer x from 2 through M, the bitrate-quality point 210(x) includes, without limitation, an encoded video ID 212(x), a resolution 214(x), a bitrate 216(x), and a quality score 218(x). The encoded video ID 212(x) identifies an encoded video that is generated or can be generated based on the shots included in the source video 102. If the encoded video ID 212(x) identifies an encoded video that is already generated, then the resolution 214(x), the bitrate 216(x), and the quality score 218(x) specify the resolution, the average bitrate, and a visual quality score for the encoded video. Otherwise, the resolution 214(x), the bitrate 216(x), and the quality score 218(x), specify the resolution, an estimated average bitrate, and an estimated visual quality score for an encoded video that can be generated as per the encoded video ID 212(x). For explanatory purposes, the resolution 214(x), the bitrate 216(x), and the quality score 218(x) are symbolized herein as Rx, Bx, and Qx, respectively.

The encoding ladder application 150 formulates the problem of generating the candidate encoding ladder 280(1)—the candidate encoding ladder 280(C) as an parameterized constrained optimization problem. As used herein a "parameterized" constrained optimization problem is a generalized version of a constrained optimization problem that is expressed in terms of at least one parameter. Each parameter associated with a constrained optimization problem is represented with a symbol. Different combinations of value(s) of the parameter(s) that are associated with the parameterized constrained optimization problem can be used to formulate different constrained optimization problems. While solving a constrained optimization problem, the value(s) of the parameter(s) do not change. A value for a parameter is also referred to herein as a "parameter value." Constrained optimization, constrained optimization problems, and techniques for solving constrained optimization problems are well-known in the art. Please see https://en.wikipedia.org/wiki/Constrained_optimization for an overview.

As shown, the encoding ladder application 150 includes, without limitation, a normalization engine 220, encoding point metadata 230, a parameterized objective function 240, a parameterized constraint set 250, a ladder configuration 260(1)—a ladder configuration 260(C), a rung assignment engine 270(1)—a rung assignment engine 270(C), the candidate encoding ladder 280(1)—the candidate encoding ladder 280(C), and the candidate encoding ladder set 158.

As persons skilled in the art will recognize, bitrates and visual quality scores associated with encoded videos usually, if not always, have different magnitudes. In some embodiments, to facilitate formulating encoding ladder generation as a parameterized constraint optimization problem, the normalization engine 220 normalizes the bitrate 216(1)—the bitrate 216(M) and the quality score 218(1)—the quality score 218(M) to a common range.

More precisely, in some embodiments, the normalization engine 220 log transforms the bitrate 216(1)—the bitrate 216(M) to generate log transformed bitrates (not shown). The normalization engine 220 applies normalization to the log transformed bitrates and the quality score 218(1)—the quality score 218(M) to generate the normalized bitrate array 236 and the normalized quality score array 238, respectively. The normalized bitrates in the normalized bitrate array 236 are derived from $B_1$-$B_M$ and are symbolized herein as $B'_1$-$B'_M$, respectively. The normalized quality scores in the normalized quality score array 238 correspond to $Q_1$-$Q_M$ and are symbolized herein as $Q'_1$-$Q'_M$, respectively.

In some alternate embodiments, the normalization engine 220 and/or the encoding ladder application 150 can perform any number (including none) and/or types of normalization operations on the bitrate 216(1)—the bitrate 216(M) and/or the quality score 218(1)—the quality score 218(M) in any technically feasible fashion, and the techniques described herein are modified accordingly. For example, in some alternate embodiments, the normalization engine 220 normalizes the bitrate 216(1)—the bitrate 216(M) but not the quality score 218(1)—the quality score 218(M) or the quality score 218(1)—the quality score 218(M) but not the bitrate 216(1)—the bitrate 216(M). In some embodiments, the encoding ladder application 150 omits the normalization engine 220.

The encoding point metadata 230 includes arrays of constants that are specified in or derived from the convex hull metadata 136 and are used to formulate the parameterized constrained optimization problem. As shown, the encoding point metadata 230 includes, without limitation, an ID array 222, a resolution array 224, a bitrate array 226, a quality score array 228, the normalized bitrate array 236, and the normalized quality score array 238. The encoding ladder application 150 re-organizes the convex hull metadata 136 to generate the ID array 222, the resolution array 224, the bitrate array 226, and the quality score array 228. The ID array 222 includes the encoded video ID 212(1)—the encoded video ID 212(M). The resolution array 224 includes the resolution 214(1)—the resolution 214(M) that are symbolized as $R_1$-$R_M$, respectively. The bitrate array 226 includes the bitrate 216(1)—the bitrate 216(M) that are symbolized as $B_1$-$B_M$, respectively. The quality score array 228 includes the quality score 218(1)—quality score 218(M) that are symbolized as $Q_1$-$Q_M$, respectively. Note that the total number of bitrate-quality points or "bitrate-quality point count" that is symbolized herein as M is a constant in the context of the parameterized constraint optimization problem.

The encoding ladder application 150 defines the parameterized objective function 240 based on an overall objective of determining N rung assignments for a candidate encoding ladder that collectively optimize a tradeoff between increasing the streaming QoE of the candidate encoding ladder and reducing the storage footprint of the candidate encoding ladder. As used herein, N symbolizes a rung count that is a parameter specifying the total number of rungs of the candidate encoding ladder. A "rung count" is also referred to herein as a "number of rungs." Each rung assignment indicates that a different one of the bitrate-quality points 210 is assigned to a different rung of the candidate encoding ladder.

As described in greater detail below in conjunction with the parameterized constraint set 250, the rung assignments are constrained such that bitrates specified via the rung 1 through the rung N increase monotonically. For explanatory purposes, rung 1 and rung N of a candidate encoding ladder are also referred to herein as a "lowest rung" and a "highest rung" of the candidate encoding ladder.

In general, the "streaming QoE" of an encoding ladder quantifies an average QoE of viewers of a media title that has been encoded and streamed to client devices. A typical QoE metric reflects both visual quality levels associated with the encoded chunks used for streaming and the impact of any re-buffering events on the overall quality of the viewing experience. As persons skilled in the art will recognize, the streaming QoE associated with an encoding ladder cannot be accurately measured until the encoding ladder is deployed. Accordingly, the encoding ladder application 150 defines a quality term (not shown in FIG. 2) that correlates with the streaming QoE.

The quality term is a weighted average of the normalized quality scores specified in the N bitrate-quality points that are assigned to the N rungs of a candidate encoding ladder. The quality term is associated with a different "rung quality" weight for each of the N rungs, where the N rung quality weights are parameters of the parameterized constrained optimization problem. A rung quality weight associated with the rung j is symbolized herein as $w_j$. The values of the rung quality weights can be determined in any technically feasible fashion. In some embodiments, the values of the rung quality weights are predetermined. In some other embodiments, the values of the rung quality weights are derived from empirical statistics, such as network throughput and/or bitrate demand distributions.

As persons skilled in the art will recognize, the sum of the bitrates of the encoded videos included in an encoding ladder is proportional to the storage footprint of the encoding ladder. Accordingly, the encoding ladder application 150 defines a footprint term (not shown in FIG. 2) as the sum of the normalized bitrates of the N encoded videos that are assigned to the N rungs of a candidate encoding ladder.

An overall objective of maximizing the streaming QoE of a candidate encoding ladder while minimizing the storage footprint of the candidate encoding ladder inherently represents a tradeoff between the streaming QoE and the storage footprint. To explicitly capture the tradeoff between the streaming QoE and the storage footprint in a flexible fashion, the encoding ladder application 150 weights the quality term and the footprint term by a quality term weight and a footprint term weight, respectively. The parameterized objective function 240 therefore represents a weighted tradeoff between a weighted average of a subset of a set of normalized quality scores associated with a set of encoded videos and a sum of a subset of a set of normalized bitrates associated with the set of encoded videos. More precisely, in some embodiments, the parameterized objective function 240 represents a weighted tradeoff between a weighted average of a subset of the normalized quality score array 238 corresponding to a subset of the ID array 222 and a sum of a subset of the normalized bitrate array 236 corresponding to the same subset of the ID array 222.

The quality term weight and the footprint term weight are parameters of the parameterized constrained optimization problem. Values of the quality term weight and the footprint term weight reflect the relative importance of maximizing the streaming QoE of a candidate encoding ladder and the relative importance of minimizing the storage footprint of the candidate encoding ladder, respectively.

As described in greater detail below in conjunction with FIG. 3, to facilitate expressing rung assignments via the parameterized objective function 240, the encoding ladder application 150 defines an assignment matrix. The assignment matrix specifies multiple assignments between the set of encoded videos corresponding to the ID array 222 and a set of rungs that are to be included in a candidate encoding ladder. More specifically, the assignment matrix is an M×N Boolean matrix that is symbolized herein as X. The rows 1-M of X correspond to the bitrate-quality point 210(1)—the bitrate-quality point 210(M), respectively. The columns of X correspond to a rung 1-a rung N of the candidate encoding ladder 280(1).

The symbol $X_{i,j}$ denotes the element in the $i^{th}$ row and the $j^{th}$ column of the assignment matrix 370(1). If $X_{i,j}$ is 1, then the bitrate-quality point 210(i) is assigned to the rung j of a candidate encoding ladder. If $X_{i,j}$ is 0, then the bitrate-quality point 210(i) is not assigned to the rung j of the candidate encoding ladder. As referred to herein, if the bitrate-quality point 210(i) is assigned to a rung j of a candidate encoding ladder, then the encoded video corresponding to the encoded video ID 212(i), the resolution 214(i), the bitrate 216(i), and the quality score 218(i) are also assigned to the rung j. Further, if the bitrate-quality point 210(i) is assigned to a rung j of a candidate encoding ladder, then the rung j is referred to herein as "specifying" the encoded video corresponding to the encoded video ID 212(i), the encoded video ID 212(i), the resolution 214(i), the bitrate 216(i), and the quality score 218(i).

Although not shown, in some embodiments, the encoding ladder application 150 implements the parameterized objective function 240 as follows:

$$\max\left(q\sum_{i=1}^{M}\sum_{j=1}^{N}X_{i,j}?_i'w_j - b\sum_{i=1}^{M}\sum_{j=1}^{N}X_{i,j}B_i'\right) \quad (1)$$

In equation (1), the first term is the quality term, the second term is the footprint term, and the symbols q and b denote the quality term weight and the footprint term weight, respectively.

The encoding ladder application 150 defines values for the rung quality weights $w_1$-$w_N$ using the following equations:

$$\sum_{j=1}^{N}w_j = 1 \quad (2a)$$

where $$w_j = \alpha\sum_{k=1}^{j-1}w_k, \quad (2b)$$

$$\forall j \in \{2 ... N\}$$

In equation (2b), the symbol α denotes a weight generation parameter that is associated with the overall optimization problem.

Assigning higher values to rung quality weights associated with higher rungs as per equation (2b) emulates historical streaming statistics indicating that, for a given encoding ladder, the frequency with which each of the rungs is actually selected for streaming by client devices typically increases as the corresponding quality score increases. Consequently, the quality term in equation (1) approximates an average visual quality level of the different instances of encoded videos specified in a candidate encoding ladder that are predicted to be streamed to client devices.

In some other embodiments, the values of the rung quality weights are set to 1 and the quality term in equation (1) represents an average visual quality level of the encoded videos specified in the candidate encoding ladder. More generally, as part of generating an objective function, a rung assignment engine can compute any number of values for any number of weights that are referenced by the objective function and are associated with a set of rungs based on a ladder configuration.

As shown, the encoding ladder application 150 generates the parameterized constraint set 250. The parameterized constraint set 250 includes any number and/or types of constraints, where each constraint restricts one or more rung assignments and can be associated with zero or more parameters. In some embodiments, the parameterized constraint set 250 includes implicit logical constraints and practical logical constraints. The implicit logical constraints ensure that the set of rung assignments specified via a final "optimized" assignment matrix corresponds to a valid encoding ladder. The practical logical constraints capture restrictions and/or preferences that are associated with any operational aspects of streaming videos. Some examples of operational aspects of streaming videos include the capabilities of client devices, network capacity, a CDN, human perception of visual quality, and the like.

In some embodiments, the implicit logical constraints include, without limitation, a parameterized rung assignment constraint, a parameterized point assignment constraint, and a parameterized monotonically increasing bitrate constraint. The practical logical constraints include, without limitation, a parameterized footprint upper bound constraint, a parameterized required resolution constraint, a parameterized low bitrate point constraint, a parameterized high quality point constraint, a parameterized minimum quality spacing constraint, a parameterized maximum quality spacing constraint, and a parameterized bitrate spacing constraint.

The parameterized rung assignment constraint is that exactly one of the bitrate-quality points 210 is assigned to each rung of a candidate encoding ladder. The parameterized rung assignment constraint can be expressed as follows:

$$\sum_{i=1}^{M}X_{i,j} = 1, \quad (3)$$

$$\forall j \in \{1 ... N\}$$

The parameterized point assignment constraint is that each of the bitrate-quality points 210 is assigned to at most one rung of a candidate encoding ladder. The parameterized point assignment constraint can be expressed as follows:

$$\sum_{j=1}^{N}X_{i,j} \leq 1, \quad (4)$$

-continued $$\forall \, j \in \{1 \, \dots \, M\}$$

The parameterized monotonically increasing bitrate constraint is that the bitrate increases monotonically between rungs. The parameterized monotonically increasing bitrate constraint can be expressed as follows:

$$\sum_{i=1}^{M} X_{i,j} B_i \leq \sum_{i=1}^{M} X_{i,j+1} B_i, \tag{5}$$

$$\forall \, j \in \{1 \, \dots \, N-1\}$$

In accordance with equation (5), rung 1 and rung N of a candidate encoding ladder correspond to the lowest bitrate and the highest bitrate, respectively of the encoding ladder.

Because the storage resources of CDNs are limited, the encoding ladder application 150 implements the parameterized footprint upper bound constraint. The parameterized footprint upper bound constraint is that the sum of the bitrates of the encoded videos assigned to the rungs of a candidate encoding ladder is less than or equal to a footprint upper bound. The parameterized footprint upper bound constraint can be expressed as follows:

$$\sum_{i=1}^{M} \sum_{j=1}^{N} X_{i,j} B_i \leq \text{footprint upper bound} \tag{6}$$

Because the screens of different client devices can have different resolutions, the encoding ladder application 150 implements one or more constraints associated with at least one resolution that the candidate encoding ladder is required to represent. Although not shown in FIG. 2, the encoding ladder application 150 implements a different required resolution constraint for each of zero or more required resolutions based on the parameterized required resolution constraint. The parameterized required resolution constraint is that at least one of the bitrate-quality points 210 assigned to the rungs of a candidate encoding ladder specifies a required resolution. The parameterized required resolution constraint can be expressed as follows:

$$\sum_{k \in A} \sum_{j=1}^{N} X_{k,j} \geq 1 \tag{7}$$

In equation (7), A denotes the subset of $i \in \{1 \, \dots \, M\}$ for which $R_i$ is equal to a "required resolution."

In an effort to ensure uninterrupted playback of a media title under challenging network conditions, the encoding ladder application 150 implements the parameterized low bitrate point constraint. The parameterized low bitrate point is that at least one of the bitrate-quality points 210 assigned to the rungs of a candidate encoding ladder specifies a bitrate that is less than or equal to a "low bitrate." The parameterized low bitrate point constraint can be expressed as follows:

$$\sum_{k \in D} \sum_{j=1}^{N} X_{k,j} \geq 1 \tag{8}$$

In equation (8), D denotes the subset of $i \in \{1 \, \dots \, M\}$ for which $B_i$ is less than or equal to a "low bitrate."

In an effort to ensure that a sufficiently high visual quality is perceived by viewers when streaming a media title over a connection having a relatively high network capacity, the encoding ladder application 150 implements the parameterized high quality point constraint. The parameterized high quality point constraint is that at least one of the bitrate-quality points 210 assigned to the rungs of a candidate encoding ladder specifies a quality score that is greater than or equal to a "high quality score." The parameterized high quality point constraint can be expressed as follows:

$$\sum_{k \in E} \sum_{j=1}^{N} X_{k,j} \geq 1 \tag{9}$$

In equation (9), E denotes the subset of $i \in \{1 \, \dots \, M\}$ for which $Q_i$ is greater than or equal to a "high quality score."

A parameterized minimum quality spacing constraint is that consecutive rungs of a candidate encoding ladder specify quality scores that are separated by at least a minimum quality spacing. The parameterized minimum quality spacing constraint can be expressed as follows:

$$\sum_{i=1}^{M} X_{i,j+1} Q_i - \sum_{i=1}^{M} X_{i,j} Q_i \geq \Delta Q_{min}, \tag{10}$$

$$\forall \, j \in \{1 \, \dots \, N-1\}$$

In equation (10), $\Delta Q_{min}$ symbolizes a minimum quality spacing.

A parameterized maximum quality spacing constraint is that consecutive rungs of a candidate encoding ladder specify quality scores that are separated by no more than a maximum quality spacing. The parameterized maximum quality spacing constraint can be expressed as follows:

$$\sum_{i=1}^{M} X_{i,j+1} Q_i - \sum_{i=1}^{M} X_{i,j} Q_i \leq \Delta Q_{max}, \tag{11}$$

$$\forall \, j \in \{1 \, \dots \, N-1\}$$

In equation (11), $\Delta Q_{max}$ symbolizes a maximum quality spacing

The parameterized bitrate spacing constraint is that consecutive rungs of a candidate encoding ladder specify bitrates that are separated by no more than a relative bitrate spacing. The parameterized bitrate spacing constraint can be expressed as follows:

$$\sum_{i=1}^{M} X_{i,j+1} B_i \leq \lambda \sum_{i=1}^{M} X_{i,j} B_i, \tag{12}$$

$$\forall \, j \in \{1 \, \dots \, N-1\}$$

In equation (12), $\lambda$ symbolizes a relative bitrate spacing.

Each of the ladder configuration 260(1)—the ladder configuration 260(C) specifies, without limitation, a different set of values for the set of parameters associated with the parameterized constraint optimization problem. The encoding ladder application 150 can generate the ladder configuration 260(1)—the ladder configuration 260(C) in any technically feasible fashion. More generally, the encoding ladder application 150 can determine different sets of parameter values for a union of a set of parameters included in the parameterized objective function 240 and a set of parameters included in the parameterized constraint set 250 to generate the ladder configuration 260(1)—the ladder configuration 260(C), As shown, the ladder configuration 260(1) includes, without limitation, a rung count 262(1), a rung quality weight set 264(1), an objective parameter set 266(1), and a constraint parameter set 268(1). Although not shown, for an integer x from 2 through C, the ladder configuration 260(x) includes, without limitation, a rung count 262(x), a rung quality weight set 264(x), an objective parameter set 266(x), and a constraint parameter set 268(x).

Each of the rung count 262(1)—the rung count 262(C) specifies a value for the rung count. Each of the rung quality weight set 264(1)—the rung quality weight set 264(C) specifies a different value for each of the rung quality weights. In some embodiments, the encoding ladder application 150 computes the rung quality weight set 264(1)—the rung quality weight set 264(C) based on the equations (2a) and (2b) and the rung count 262(1)—the rung count 262(C), respectively.

Each of the objective parameter set 266(1)—the objective parameter set 266(C) specifies values for the quality term weight and the bitrate term weight. Each of the constraint parameter set 268(1)—the constraint parameter set 268(C) specifies zero or more required resolutions and values for the footprint upper bound, the high quality score, the low bitrate, the minimum quality spacing, the maximum quality spacing, and the relative bitrate spacing.

The rung assignment engine 270(1)—the rung assignment engine 270(C) are different instances of a single software application referred to herein as the "rung assignment engine." As shown, the encoding ladder application 150 executes the rung assignment engine 270(1) on the ladder configuration 260(1), the encoding point metadata 230, the parameterized objective function 240, and the parameterized constraint set 250 to generate the candidate encoding ladder 280(1). As also shown, the encoding ladder application 150 executes the rung assignment engine 270(C) on the ladder configuration 260(C), the encoding point metadata 230, the parameterized objective function 240, and the parameterized constraint set 250 to generate the candidate encoding ladder 280(C). Although not shown, for an integer x from 2 through (C-1), the encoding ladder application 150 executes the rung assignment engine 270(x) on the ladder configuration 260(x), the encoding point metadata 230, the parameterized objective function 240, and the parameterized constraint set 250 to generate the candidate encoding ladder 280(x).

In general, the rung assignment engine uses the parameter values specified in a ladder configuration to derive an objective function from the parameterized objective function 240 and constraints from the parameterized constraint set 250. The rung assignment engine implements any number and/or types of constraint optimization techniques in an attempt to determine values for the elements of the assignment matrix that optimize the objective function subject to the constraints. Attempting to determine values for the assignment matrix that optimize the objective function subject to the constraints is also referred to herein as "solving" the constrained optimization problem defined by the objective function and the constraints. The rung assignment engine 270(1) is described in greater detail below in conjunction with FIG. 3.

Many modifications and variations on the functionality of the encoding ladder application 150, the parameterized objective function 240, the parameterized constraint set 250, the ladder configuration 260(1)—the ladder configuration 260(C), and the rung assignment engine as described herein will be apparent to those of ordinary skill in the art without departing from the scope and spirit of the described embodiments. In some embodiments, the encoding ladder application 150 can implement any number and/or types of objective functions and/or parameterized objective functions instead of or in addition to the parameterized objective function 240. In the same or other embodiments, the encoding ladder application 150 can generate any number of candidate encoding ladders for each of any number of objective functions and/or parameterized objective functions. In some embodiments, the number and/or types of parameters associated with the parameterized objective function 240 and/or the parameterized constraint set 250 can vary. In the same or other embodiments, the number and/or types of parameterized constraints included in the parameterized constraint set 250 can vary.

Figure 3:
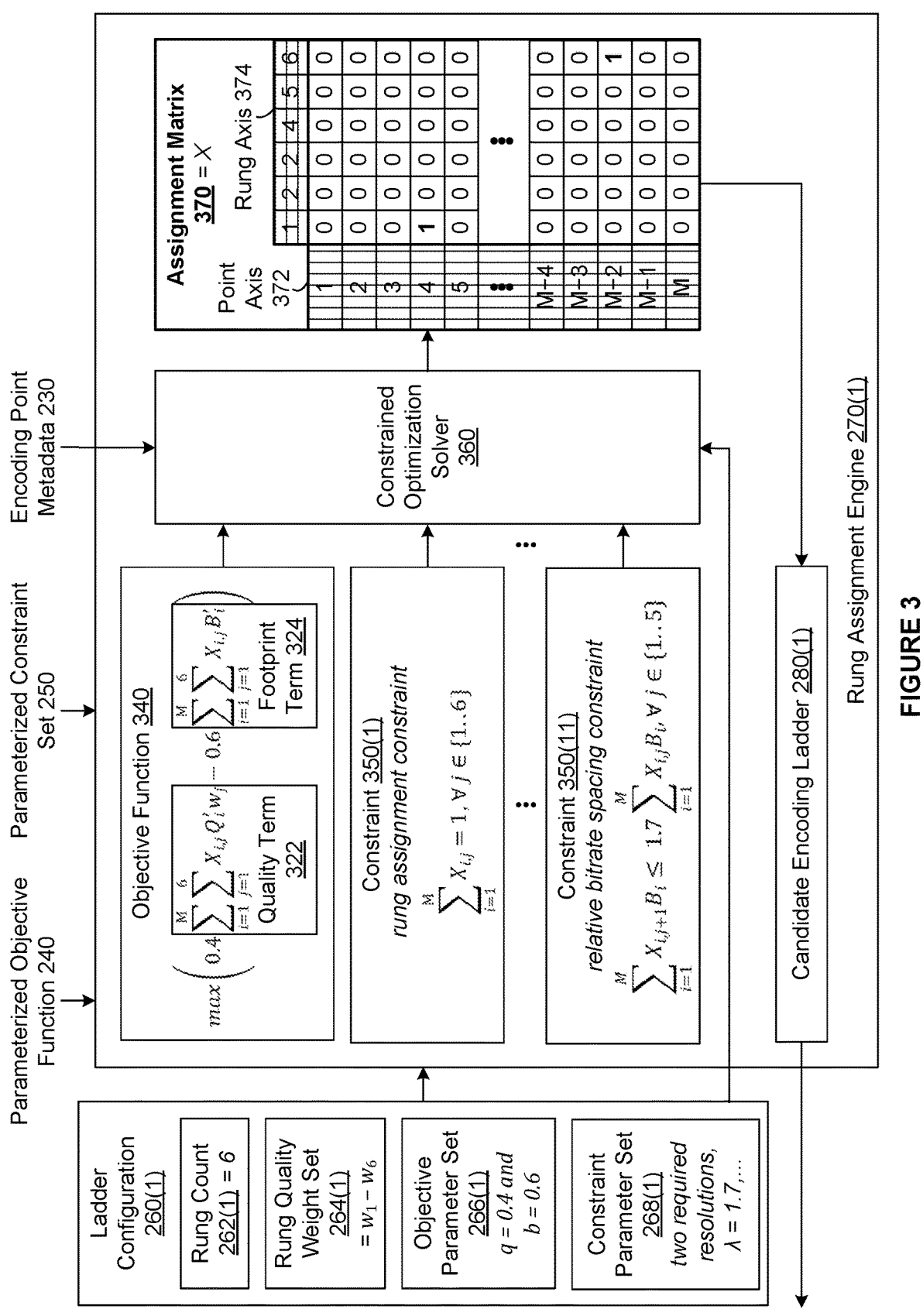
FIG. 3 is a more detailed illustration of one of the rung assignment engines of FIG. 2, according to various embodiments.

FIG. 3 is a more detailed illustration of one of the rung assignment engines of FIG. 2, according to various embodiments. More specifically, FIG. 3 depicts the rung assignment engine 270(1) that generates the candidate encoding ladder 280(1) based on the ladder configuration 260(1), the encoding point metadata 230, the parameterized objective function 240, and the parameterized constraint set 250.

As described previously herein in conjunction with FIG. 2, the ladder configuration 260(1) includes, without limitation, the rung count 262(1), the rung quality weight set 264(1), the objective parameter set 266(1), and the constraint parameter set 268(1). In the embodiment depicted in FIG. 3, the rung count 262(1) is six, and therefore the rung quality weight set 264(1) specifies values for six rung quality weights that are symbolized as $w_1$-$w_6$.

For explanatory purposes, the objective parameter set 266(1) specifies values of 0.4 and 0.6 for the quality term weight and the footprint term weight, respectively. And the constraint parameter set 268(1) specifies two required resolutions (e.g., 1280×720 and 1920×1080), values for the footprint upper bound, the high quality score, the low bitrate, the minimum quality spacing, and the maximum quality spacing, and a value of 1.7 for the relative bitrate spacing.

As described previously herein in conjunction with FIG. 2, the encoding point metadata 230 are arrays of constants that are specified in or derived from the convex hull metadata 136 and are used to formulate the parameterized constrained optimization problem. More specifically, the encoding point metadata 230 includes, without limitation, the resolution array 224, the bitrate array 226, the quality score array 228, the normalized bitrate array 236, and the normalized quality score array 238. As noted previously herein, the resolution array 224, the bitrate array 226, the quality score array 228, the normalized bitrate array 236, and the normalized quality score array 238 include $R_1$-$R_M$, $B_1$-$B_M$, $Q_1$-$Q_M$, $B'_1$-$B'_M$, and $Q'_1$-$Q'_M$, respectively.

As shown, the rung assignment engine 270(1) includes, without limitation, an objective function 340, a constraint 350(1)—a constraint 350(11), a constrained optimization solver 360, and an assignment matrix 370. The rung assignment engine 270(1) generates the objective function 340 based on the rung count 262(1) and the objective parameter set 266(1). The rung assignment engine 270(1) generates the constraint 350(1)—the constraint 350(11) based on the ladder configuration 260(1) and the parameterized constraint set 250. The constrained optimization solver 360 implements any number and/or types of constrained optimization techniques in an attempt to determine values for the elements of the assignment matrix 370 that optimize the objective function 340 subject to the constraint 350(1)—the constraint 350(11) and for the ladder configuration 260(1) and the encoding point metadata 230.

As shown, the assignment matrix 370(1) is an M×6 Boolean matrix symbolized as X. The rows 1-M of X correspond to the bitrate-quality point 210(1)—the bitrate-quality point 210(M), respectively. The columns of X correspond to a rung 1-a rung 6 of the candidate encoding ladder 280(1). After the constrained optimization solver 360 determines final values for the candidate encoding ladder 280(1), the rung assignment engine 270(1) generates the rungs of the candidate encoding ladder 280(1) based on the entries of 1 in the assignment matrix 370(1). If the entry $X_{i,j}$ is 1, then the rung assignment engine 270(1) generates the rung j of the candidate encoding ladder 280(1) based on the bitrate-quality point 210($i$).

As described previously herein in conjunction with FIG. 2, the parameterized objective function 240 can be expressed as equation (1). The rung assignment engine 270(1) replaces the parameters represented by the symbols N, q, and b in equation (1) with the rung count 262(1) of 6, the quality term weight of 0.4, and the footprint term weight of 0.6 to generate the objective function 340 that can be expressed as follows:

$$\max\left(0.4\sum_{i=1}^{M}\sum_{j=1}^{6}X_{i,j}\,\bar{q}'_i w_j - 0.6\sum_{i=1}^{M}\sum_{j=1}^{6}X_{i,j}B'_i\right) \quad (13)$$

In equation (13), the values for $w_1$-$w_6$ are specified in the rung quality weight set 264(1).

As depicted, the following portion of equation (13) expresses a quality term 322 as a rung-weighted average of the normalized quality scores associated with a subset of the bitrate-quality points 210 that are assigned to the rungs of the candidate encoding ladder 280(1):

$$\sum_{i=1}^{M}\sum_{j=1}^{6}X_{i,j}\,\bar{q}'_i w_j \quad (13a)$$

And the following portion of equation (13) expresses a footprint term 324 as a sum of the normalized bitrates associated with the subset of the bitrate-quality points 210 that are assigned to the rungs of the candidate encoding ladder 280(1):

$$\sum_{i=1}^{M}\sum_{j=1}^{6}X_{i,j}B'_i \quad (13b)$$

The parameter values of 0.4 and 0.6 for the parameters of the quality term weight and the footprint term weight, respectively, indicate a relative importance of the QoE and the storage footprint associated with the objective function 340 and therefore the candidate encoding ladder 280(1). More specifically, the tradeoff between QoE and storage footprint represented by the objective function 340 favors decreasing the storage footprint of the candidate encoding ladder 280(1) at the expense of increasing the QoE of the candidate encoding ladder 280(1).

As described previously herein in conjunction with FIG. 2, the parameterized constraint set 250 includes the parameterized footprint upper bound constraint, the parameterized required resolution constraint, the parameterized low bitrate point constraint, the parameterized high quality point constraint. the parameterized minimum quality spacing constraint, the parameterized maximum quality spacing constraint, and the parameterized bitrate spacing constraint.

The rung assignment engine 270(1) generates the constraint 350(1)—a constraint 350(11), based on the rung count 262(1), the constraint parameter set 268(1), and the parameterized constraint set 250. The constraint 350(1)—the constraint 350(11) are a rung assignment constraint, a point assignment constraint, a monotonically increasing bitrate constraint, a footprint upper bound constraint, two required resolution constraints, a low bitrate point constraint, a high quality point constraint. a minimum quality spacing constraint, a maximum quality spacing constraint, and a bitrate spacing constraint, respectively. For explanatory purposes, FIG. 3 depicts the constraint 350(1) and the constraint 350(11) in more detail.

The constraint 350(1) is a rung assignment constraint that the rung assignment engine 270(1) derives from the parameterized rung assignment constraint described previously herein in conjunction with FIG. 2. The rung assignment engine 270(1) replaces N in equation (3) with the rung count 262(1) of 6 to generate the constraint 350(1). The constraint 350(1) is that exactly one of the bitrate-quality points 210 is assigned to each of the six rungs of the candidate encoding ladder 280(1). As shown, the constraint 350(1) can be expressed as follows:

$$\sum_{i=1}^{M}X_{i,j} = 1, \quad (14)$$

$$\forall\, j \in \{1 \dots 6\}$$

The constraint 350(11) is a bitrate spacing constraint that the rung assignment engine 270(1) derives from the parameterized bitrate spacing constraint described previously herein in conjunction with FIG. 2. The rung assignment engine 270(1) replaces (N−1) and λ in equation (12), with 5 (one less than the rung count 262(1) of 6) and 1.7, respectively, to generate the constraint 350(11). The constraint 350(11) is that consecutive rungs of the candidate encoding ladder 280(1) specify bitrates that are separated by no more than twice the bitrate of the lower rung. As shown, the constraint 350(11) can be expressed as follows:

$$\sum_{i=1}^{M}X_{i,j+1}B_i \leq 1.7\sum_{i=1}^{M}X_{i,j}B_i, \quad (15)$$

$$\forall\, j \in \{1 \dots 5\}$$

As shown, the rung assignment engine 270(1) causes the constrained optimization solver 360 to solve the objective function 340 subject to the constraint 350(1)—the constraint 350(11) based on the ladder configuration 260(1) and the encoding point metadata 230 to generate a final version of the assignment matrix 370. As shown, the M rows of X lie along a point axis 372 and the 6 columns of Xlie along a rung axis 374.

As per the point axis 372, the top row of the assignment matrix 370 corresponds to the point index of 1 and therefore the bitrate-quality point 210(1), the encoded video ID 212 (1), $R_1$, $B_1$, $Q_1$, $B'_1$, and $Q'_1$. The bottom row of the assignment matrix 370 corresponds to the point index of M and therefore the bitrate-quality point 210(M), the encoded video ID 212(M), $R_M$, $B_M$, $Q_M$, $B'_M$, and $Q'_M$. As per the rung axis 374, the leftmost column and the rightmost column of the assignment matrix 370 correspond to a rung 1 and a rung 6, respectively, that are the lowest rung and the highest rung, respectively, of the candidate encoding ladder 280(1).

In some embodiments, the constrained optimization solver 360 executes a constrained optimization algorithm on the objective function 340, the constraint 350(1)—the constraint 350(11), the rung quality weight set 264(1), and the encoding point metadata 230 to generate the candidate encoding ladder 280(1). More generally, the constrained optimization solver 360 can execute any number and/or types of constrained optimization algorithms to solve the objective function 340 subject to the constraint 350(1)—the constraint 350(11) and using the values specified in the rung quality weight set 264(1) and the encoding point metadata 230. As used herein, a constrained optimization algorithm is any algorithm that implements any number and/or types of constrained optimization techniques as known in the art.

For example, the constrained optimization solver 360 can execute a genetic algorithm that implements search-based optimization techniques. In another example, the constrained optimization solver 360 can execute a surrogate optimization algorithm that implements a surrogate model to approximate the objective function 340. Some examples of other constrained optimization techniques that can be used to generate candidate encoding ladders include branch and bound techniques, cutting planes techniques, and surrogate model techniques. Constrained optimization solvers are well-known in the art. Please see https://github.com/google/or-tools #readme for an overview of a software suite known as "Google Optimization Tools" that includes several different constrained optimization solvers.

As described previously herein, if $X_{i,j}$ is 1, then the bitrate-quality point 210(i) is assigned to the rung j. Otherwise, the bitrate-quality point 210(i) is not assigned to the rung j. Notably, as per constraint 350(3) (i.e., the monotonically increasing bitrate constraint), for an integer x from 1 through (N− 1), the bitrate specified in the bitrate-quality point 210 that is assigned to the rung x is less than the bitrate specified in the bitrate-quality point 210 that is assigned to the rung (x+1).

After the constrained optimization solver 360 has finished executing, the rung assignment engine 270(1) generates the candidate encoding ladder 280(1) based on the entries of 1 in the assignment matrix 370(1) and ignores the entries of 0 in the assignment matrix 370(1). More specifically, the rung assignment engine 270(1) generates the candidate encoding ladder 280(1) based on the six entries of 1 in the assignment matrix 370.

In some embodiments, if the entry $X_{i,j}$ is 1, then the rung assignment engine 270(1) generates a rung j of the candidate encoding ladder 280(1) that specifies, without limitation, the encoded video ID 212(i), $R_i$, $B_i$, and optionally $Q_i$, Referring back to FIG. 2, $R_i$, is equal to the resolution 214(i), $B_i$ is equal to the bitrate 216(i), and $Q_i$, is equal to the quality score 218(i) associated with the encoded video corresponding to the encoded video ID 212(i).

For explanatory purposes, FIG. 3 depicts the entries in the top five rows and the bottom five rows of the assignment matrix 370 at a point-in-time after the constrained optimization solver 360 has finished executing. As shown, $X_{4,1}$ and $X_{M-2,6}$ are both equal to 1. Because $X_{4,1}$ is equal to 1, the rung assignment engine 270(1) generates a rung 1 of the candidate encoding ladder 280(1) that specifies the encoded video ID 212(4), $R_4$, $B_4$, and optionally $Q_4$. Because $X_{M-2,6}$ is equal to 1, the rung assignment engine 270(1) generates a rung 6 of the candidate encoding ladder 280(1) that specifies the encoded video ID 212(M−2), $R_{M-2}$, $B_{M-2}$, and optionally $Q_{M-2}$, Although not shown, the rung assignment engine 270(1) also generates a rung 2-a rung 5 of the candidate encoding ladder 280(1) based on the four other entries in the assignment matrix 370 that are equal to 1.

Simulation-Based Evaluation and Selection of Candidate Encoding Ladders

Figure 4:
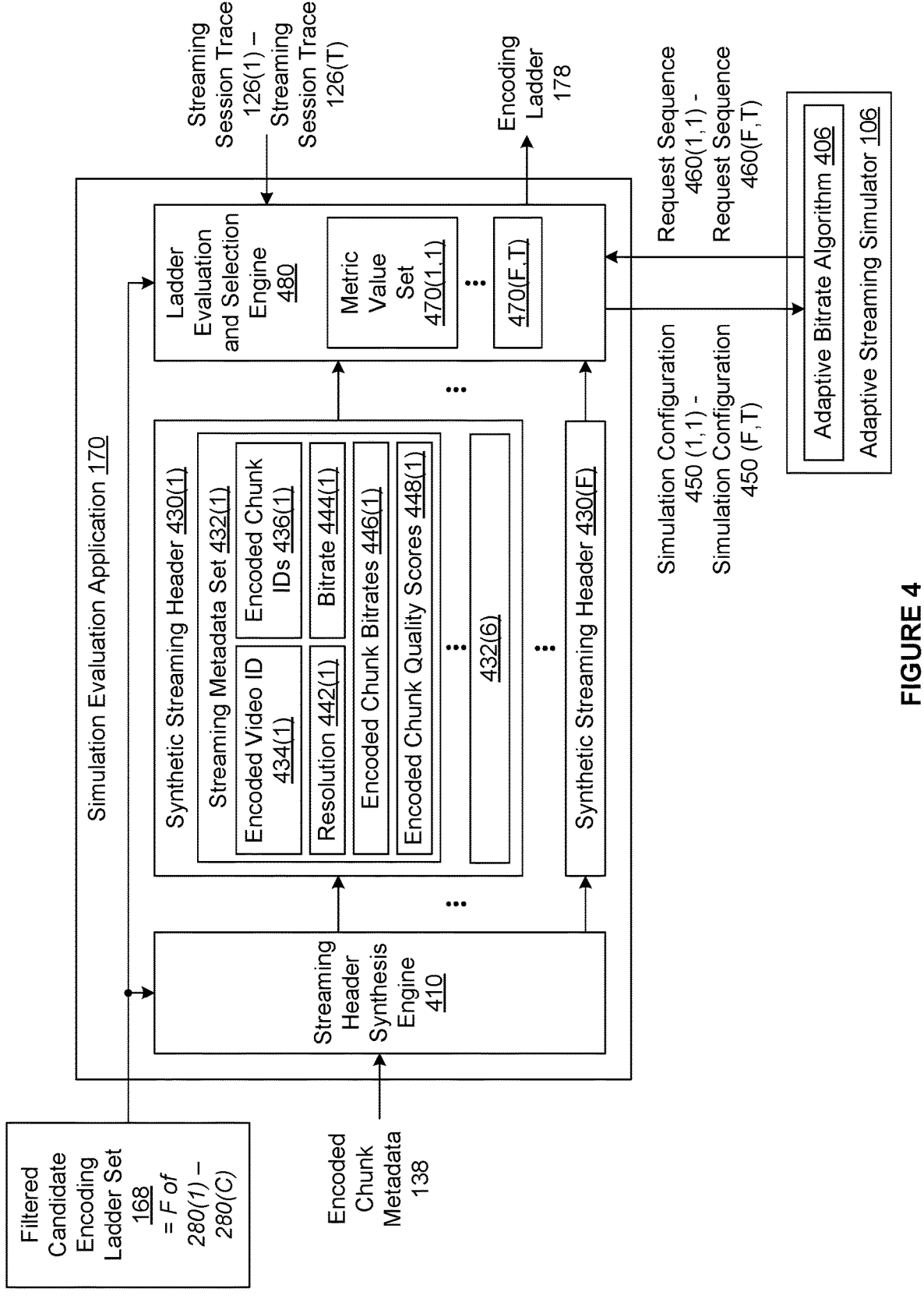
FIG. 4 is a more detailed illustration of the simulation evaluation application of FIG. 1, according to various embodiments.

FIG. 4 is a more detailed illustration of the simulation evaluation application 170 of FIG. 1, according to various embodiments. The simulation evaluation application 170 generates the encoding ladder 178 based on the filtered candidate encoding ladder set 168, the encoded chunk metadata 138, and the streaming session traces 126. As shown, the simulation evaluation application 170 includes, without limitation, a streaming header synthesis engine 410, a synthetic streaming header 430(1)—a synthetic streaming header 430(F), and a ladder evaluation and selection engine 480.

The streaming header synthesis engine 410 generates each of the synthetic streaming header 430(1)—the synthetic streaming header 430(F) based on a different candidate encoding ladder in the filtered candidate encoding ladder set 168 and the encoded chunk metadata 138. As described previously herein in conjunction with FIG. 1, the filtered candidate encoding ladder set 168 includes F of the candidate encoding ladder 280(1)—the candidate encoding ladder 280(C), where C can be any positive integer and F can be any positive integer that is less than or equal to C. Notably, each of the F candidate encoding ladders included in the filtered candidate encoding ladder set 168 includes a different set of rungs, where the number of rungs in each set of rungs can vary across the filtered candidate encoding ladder set 168. Furthermore, the encoded videos and the resolutions specified in the different sets of rungs can vary across the filtered candidate encoding ladder set 168. The encoded chunk metadata 138 specifies, without limitation, the encoded chunks of each encoded video specified (via corresponding encoded video IDs) in the convex hull metadata 136, the bitrates of the encoded chunks, and the quality scores of the encoded chunks.

Each of the synthetic streaming header 430(1)—the synthetic streaming header 430(F) includes a different streaming metadata set for each rung of the corresponding candidate encoding ladder. For explanatory purposes, FIG. 4 depicts the synthetic streaming header 430(1) in detail. The streaming header synthesis engine 410 generates the synthetic streaming header 430(1) based on the candidate encoding ladder 280(1) (described previously herein in conjunction with FIG. 3) and the encoded chunk metadata 138. More specifically, the streaming header synthesis engine 410 generates the synthetic streaming header 430(1) based on a set of rungs included in the candidate encoding ladder 280(1) and the encoded chunk metadata 138. Referring back to the ladder configuration 260(1) depicted in FIG. 3, the candidate encoding ladder 280(1) has six rungs where each rung specifies a different encoded video ID, the resolution of the encoded video corresponding to the encoded video ID, and the bitrate of the encoded video corresponding to the encoded video ID.

As shown, the synthetic streaming header 430(1) includes a streaming metadata set 432(1)—a streaming metadata set 432(6) that describe per-chunk video rate and quality information corresponding to the rung 1-the rung 6, respectively, of the candidate encoding ladder 280(1). The streaming metadata set 432(1) includes, without limitation, an encoded video ID 434(1), encoded chunk IDs 436(1), a resolution 442(1), and a bitrate 444(1), encoded chunk bitrates 446(1), and encoded chunk quality scores 448(1). The encoded video ID 434(1) identifies an encoded video corresponding to the rung 1 of the candidate encoding ladder 280(1). The resolution 442(1) and the bitrate 444(1) specify the resolution and the average bitrate, respectively, of the encoded video corresponding to the encoded video ID 434(1). The encoded chunk IDs 436(1) identify encoded chunks of the encoded video corresponding to the encoded video ID 434(1). The encoded chunk bitrates 446(1) and the encoded chunk quality scores 448(1) specify the bitrates and the quality scores, respectively, of the encoded chunks corresponding to the encoded chunk IDs 436(1). Note that only metadata information is used to generate synthetic streaming headers. Accordingly, in some embodiments, the encoding ladder workflow 140 can generate synthetic streaming headers without requiring the production encoding pipeline 120 to generate corresponding encoded videos.

The ladder evaluation and selection engine 480 generates the encoding ladder 178 based on the synthetic streaming header 430(1)—synthetic streaming header 430(F) and the streaming session trace 126(1)—the streaming session trace 126(T). Each of the streaming session trace 126(1)—the streaming session trace 126(T) is a network throughput trace having a duration that is greater than or equal to the playback time of the media title. As described previously herein in conjunction with FIG. 1, a network throughput trace indicates a network throughput as a function of time over the duration of the trace.

In some embodiments, each of the streaming session trace 126(1)—the streaming session trace 126(T) is either a recorded network throughput trace or a synthetic network throughput trace. A recorded network throughput trace specifies recorded measurements of the throughput of an actual network. A synthetic network throughput trace is synthesized by a software application (e.g., the simulation evaluation application 170) in any technically feasible fashion.

As shown, the ladder evaluation and selection engine 480 executes the adaptive streaming simulator 106 on a simulation configuration 450(1,1)—a simulation configuration 450(F,T) to generate a request sequence 460(1,1)—a request sequence 460(F, T), respectively. The ladder evaluation and selection engine 480 therefore executes the adaptive streaming simulator 106 a total of (F*T) different times. The adaptive streaming simulator 106 emulates some of the behavior of an endpoint application executing on a client device during an adaptive streaming session. In particular, the adaptive streaming simulator 106 implements an ABR algorithm 406 that attempts to optimize the visual quality experienced during playback of a streamed media title while avoiding playback interruptions due to re-buffering events. In other words, the ABR algorithm 406 attempts to select a sequence of encoded chunks having the highest bitrates possible without exceeding the available network throughput. In some other embodiments, the adaptive streaming simulator 106 can implement any number and/or types of ABR algorithms that attempt to optimize the visual quality experienced during playback based on any number and/or types of criteria in any technically feasible fashion.

For explanatory purposes, an index f can be any integer from 1 through F and an index t can be any integer from 1 through T. For the simulation configuration 450(f,t), the adaptive streaming simulator 106 executes the ABR algorithm 406 on the synthetic streaming header 430(f) based on the streaming session trace 126(t) to generate the request sequence 460(f,t). More precisely, the adaptive streaming simulator 106 configures the ABR algorithm 406 to incrementally generate the request sequence 460(f,t) based on the synthetic streaming header 430(f) over a simulated streaming session that is characterized by the streaming session trace 126(t). Accordingly, the request sequence 460(ft) is a sequence of requests for encoded chunks that the ABR algorithm 406 generates based on the synthetic streaming header 430(f) and a sequence of network throughputs included in the streaming session trace 126(t). For each source chunk of the source video 102, the request sequence 460(ft) therefore specifies a corresponding encoded chunk of one of the encoded videos specified in the rungs of the candidate encoding ladder corresponding to the synthetic streaming header 430(f).

The ladder evaluation and selection engine 480 generates a metric value set 470(1,1)—a metric value set 470(F,T) based on the request sequence 460(1,1)—a request sequence 460(F,T) and the synthetic streaming header 430(1)—synthetic streaming header 430(F). More precisely, the ladder evaluation and selection engine 480 generates the metric value set 470(ft) based on the request sequence 460(f,t) and the synthetic streaming header 430(f). Each of the metric value set 470(1,1)—the metric value set 470(F,T) specifies a different set of values for a streaming evaluation metric set.

The streaming evaluation metric set can include, without limitation, any number and/or types of metrics that are relevant to streaming QoE and/or any number and/or types of associated costs (e.g., storage footprint, network bandwidth consumption). In some embodiments, the streaming evaluation metric set includes any QoE-related metrics typically measured during production A/B testing of encoding ladders. In the same or other embodiments, the metric value set 470(ft) specifies a time-weighted quality score, an average playback bitrate, a total number of re-buffering events, a total re-buffering time, a total number of rung switches, a frequency of rung switching, a weighted aggregation of any number of the previous metrics representing a streaming QoE, or any combination thereof associated with streaming the media title using the $f^{th}$ candidate encoding ladder in the filtered candidate encoding ladder set 168. Some examples of quality scores are average PSNR values, time-weighted values for the VMAF metric or "time-weighted VMAF scores," and average values for the VMAF metric or "average VMAF scores." In the same or other embodiments, the metric value set 470(f,t) specifies at least a metric value that approximates a tradeoff between streaming quality of experience and a storage footprint associated with the $f^{th}$ candidate encoding ladder in the filtered candidate encoding ladder set 168. In yet other embodiments, the metric value set 470(f,t) specifies at least a metric value that approximates a tradeoff between streaming quality of experience and a cost term associated with expected network bandwidth consumption for the $f^{th}$ candidate encoding ladder in the filtered candidate encoding ladder set 168 during an adaptive streaming session characterized by the streaming session trace 126(t).

The ladder evaluation and selection engine 480 can compute values for each metric included in the streaming evaluation metric set for any number of periods of time (e.g., an entire simulated streaming session) and/or repeatedly at any granularity (e.g., every minute).

For explanatory purposes, the metric value set 470(*f*, 1)—the metric value set 470(*f,t*) are also referred to herein as an f$^{th}$ "metric value set group." The f$^{th}$ metric value set group is associated with the synthetic streaming header 430(*f*) and therefore the f$^{th}$ candidate encoding ladder in the filtered candidate encoding ladder set 168.

The ladder evaluation and selection engine 480 performs any number and/or types of evaluations and/or comparisons between the metric value set groups corresponding to any number of the candidate encoding ladders in the filtered candidate encoding ladder set 168 and optionally any other relevant data. Based, at least in part, on the results of the evaluations and/or comparisons, the ladder evaluation and selection engine 480 can select any number of the associated candidate encoding ladders for further evaluation and/or deployment via the production encoding pipeline 120.

In some embodiments, the ladder evaluation and selection engine 480 computes an average streaming QoE for each candidate encoding ladder in the filtered candidate encoding ladder set 168 based, at least in part, on the corresponding metric value set group. The ladder evaluation and selection engine 480 then selects the candidate encoding ladder representing the highest average streaming QoE to storage footprint tradeoff for further evaluation and/or deployment via the production encoding pipeline 120 (not shown in FIG. 4).

In some other embodiments, the ladder evaluation and selection engine 480 performs one-on-one comparisons between pairs of candidate encoding ladders in the filtered candidate encoding ladder set 168 based, at least in part, on the corresponding metric value set groups. The ladder evaluation and selection engine 480 then selects any number of the candidate encoding ladders in the filtered candidate encoding ladder set 168 for further evaluation and/or deployment via the production encoding pipeline 120 based, at least in part, on the results of the one-on-one comparisons.

For example, the ladder evaluation and selection engine 480 could compare two different metric values for the same metric that are specified in the metric value set 470(1,1) and the metric value set 470(2,1). Based on the result of the comparison, the ladder evaluation and selection engine 480 could determine that a first candidate encoding ladder associated with the metric value set 470(1,1) instead of a second candidate encoding ladder associated with the metric value set 470(2,1) should be used to stream the media title. The ladder evaluation and selection engine 480 could therefore select the first candidate encoding ladder for deployment via the production encoding pipeline 120.

The ladder evaluation and selection engine 480 generates the encoding ladder 178 based on the selected candidate encoding ladder. In some embodiments, the encoding ladder 178 is a copy of the selected candidate encoding ladder. In some other embodiments, the ladder evaluation and selection engine 480 performs one or more additional operations on the selected candidate encoding ladder to generate the encoding ladder 178. For instance, in some embodiments, the ladder evaluation and selection engine 480 configures the shot-based encoding application 132 to re-generate encoded videos for each rung of the selected candidate encoding ladder using encoding techniques that are computationally more intensive than the encoding techniques associated with the encoded chunk metadata 138. More specifically, relative to a given rung of the selected candidate encoding ladder, the corresponding re-generated encoded video usually has the same resolution, approximately the same bitrate, and a higher quality score.

The ladder evaluation and selection engine 480 stores the encoding ladder 178 in any type of memory that is accessible to the production encoding pipeline 120 and/or the encoding ladder workflow 140. In some embodiments, the ladder evaluation and selection engine 480 transmits the encoding ladder 178 to the production encoding pipeline 120, the encoding ladder workflow 140, any number of other software applications, or any combination thereof. In some embodiments, the encoding ladder 178 is a final encoding ladder that is used to stream the media title to one or more client devices over a network.

In some embodiments, the ladder evaluation and selection engine 480 can perform any number and/or types of evaluations and/or comparisons between the metric value set groups corresponding to any number of the candidate encoding ladders in the filtered candidate encoding ladder set 168 and optionally any other relevant data. Based, at least in part, on the results of the evaluations and/or comparisons, the ladder evaluation and selection engine 480 can select any number of the associated candidate encoding ladders for further evaluation and/or deployment via the production encoding pipeline 120.

In some embodiments, the ladder evaluation and selection engine 480 computes an average streaming QoE for each candidate encoding ladder in the filtered candidate encoding ladder set 168 based, at least in part, on the corresponding metric value set group. The ladder evaluation and selection engine 480 then selects the candidate encoding ladder representing the highest average streaming QoE to storage footprint tradeoff for further evaluation and/or deployment via the production encoding pipeline 120 (not shown in FIG. 4).

Again, note that the techniques described herein are illustrative rather than restrictive and may be altered without departing from the broader spirit and scope of the invention. For instance, in some embodiments the functionality of the simulation evaluation application 170, the adaptive streaming simulator 106, and the ABR algorithm 406 as described herein can be consolidated into a single software application or distributed across any number of software applications in any technically feasible fashion. In the same or other embodiments, the simulation evaluation application 170 can perform simulation evaluations of any number of candidate encoding ladders and/or any number of encoding ladders (e.g., a current production encoding ladder) using any number and/or types of ABR algorithms and any number and/or types of network throughput traces in any technically feasible fashion.

FIG. 5 is a flow diagram of method steps for generating candidate encoding ladders for use when streaming a media title, according to various embodiments. Although the method steps are described with reference to the systems of FIGS. 1-3, persons skilled in the art will understand that any system configured to implement the method steps, in any order, falls within the scope of the embodiments.

As shown, a method 500 begins at step 502, where the shot-based encoding application 132 partitions a source video 102 corresponding to a media title into shots. At step 504, the shot-based encoding application 132 generates encoded shots based on the shots, any number of resolutions, and any number of sets of values for a set of encoding parameters. At step 506, for each resolution, the shot-based encoding application 132 generates a convex hull of bitrate-quality points based on the encoded shots having the resolution.

At step 508, the encoding ladder application 150 optionally normalizes the bitrates and the quality scores specified in the bitrate-quality points across all convex hulls to the same range. At step 510, the encoding ladder application 150 defines the parameterized objective function 240 representing a weighted tradeoff between a weighted average of the quality scores (optionally normalized) across rungs of a candidate encoding ladder and the sum of the bitrates (optionally normalized) across the rungs. At step 512, the encoding ladder application 150 defines parameterized constraints for candidate encoding ladders.

At step 514, the encoding ladder application 150 generates one or more different ladder configurations that each specify a different combination of values for a rung count, rung quality weights, objective parameters, and constraint parameters. At step 516, for each ladder configuration, the encoding ladder application 150 generates an objective function and associated constraints based on the parameterized objective function 240 and the parameterized constraints.

At step 518, for each ladder configuration, the encoding ladder application 150 uses a constrained optimization solver to generate a different candidate encoding ladder that solves the objective function subject to the associated constraints. At step 520, the encoding ladder application 150 stores and/or transmits the candidate encoding ladders to any number and/or types of software applications for evaluation and selection of candidate encoding ladder(s) as encoding ladder(s) for the media title. The method 500 then terminates.

FIG. 6 is a flow diagram of method steps for determining an encoding ladder for a media title based on adaptive streaming simulations of candidate encoding ladders that have been generated for the media title. Although the method steps are described with reference to the systems of FIGS. 1-4, persons skilled in the art will understand that any system configured to implement the method steps, in any order, falls within the scope of the embodiments.

As shown, a method 600 begins at step 602, where the simulation evaluation application 170 selects a first candidate encoding ladder for a media title. At step 604, the simulation evaluation application 170 generates a synthetic streaming header based on the selected candidate encoding ladder and the bitrates and quality scores for the encoded chunks of the associated encoded videos and then selects a first streaming session trace. At step 606, the simulation evaluation application 170 executes the adaptive streaming simulator 106 on the synthetic streaming header and the selected streaming session trace to determine a corresponding request sequence and a corresponding metric value set.

At step 608, the simulation evaluation application 170 determines whether the selected streaming session trace is the last streaming session trace. If, at step 608, the simulation evaluation application 170 determines that the selected streaming session trace is not the last streaming session trace, then the method 600 proceeds to step 610. At step 610, the simulation evaluation application 170 selects the next streaming session trace. The method 600 then returns to step 606, where the simulation evaluation application 170 executes the adaptive streaming simulator 106 on the synthetic streaming header and the selected streaming session trace to determine a corresponding request sequence and a corresponding metric value set.

If, however, at step 608, the simulation evaluation application 170 determines that the selected streaming session trace is the last streaming session trace, then the method 600 proceeds directly to step 612. At step 612, the simulation evaluation application 170 determines whether the selected candidate encoding ladder is the last candidate encoding ladder for the media title. If, at step 612, the simulation evaluation application 170 determines that the selected candidate encoding ladder is not the last candidate encoding ladder for the media title, then the method 600 proceeds to step 614. At step 614, the simulation evaluation application 170 selects the next candidate encoding ladder for the media title. The method 600 then returns to step 604, where the simulation evaluation application 170 generates a synthetic streaming header based on the selected candidate encoding ladder and then selects the first streaming session trace.

If, however, at step 612, the simulation evaluation application 170 determines that the selected streaming session trace is the last streaming session trace, then the method 600 proceeds directly to step 616. At step 616, the simulation evaluation application 170 selects one or more of the candidate encoding ladders for further evaluation and/or deployment via the production encoding pipeline 120 based on the corresponding metric value sets. At step 618, the simulation evaluation application 170 generates an encoding ladder for the media title based on the selected candidate encoding ladder. At step 620, the simulation evaluation application 170 stores and/or transmits the encoding ladder for the media title to any number of software applications for further evaluation and/or deployment via the production encoding pipeline 120. The method 600 then terminates.

In sum, the disclosed techniques can be used to generate an encoding ladder for a media title that inherently represents an objective of increasing streaming QoE associated with the encoding ladder while decreasing the storage footprint of the encoding ladder and concurrently satisfying multiple constraints. In some embodiments, a shot-based encoding application partitions a source video corresponding to the media title into different shots. The shot-based encoding application encodes each shot across a set of resolutions and multiple different encoding parameter sets to generate encoded shots. For each resolution, the shot-based encoding application generates a convex hull of bitrate-quality points based on the encoded shots corresponding to the resolution. Each convex hull optimizes tradeoffs between bitrate and visual quality level for the resolution. Each of the bitrate-quality points specifies a different encoded video and the corresponding resolution, bitrate, and quality score. Notably, the resolution across each of the encoded videos is constant, but the bitrate and quality score can vary.

An encoding ladder application formulates the problem of generating an encoding ladder as a parameterized constrained optimization problem of assigning bitrate-quality points to rungs of a candidate encoding ladder. The encoding ladder application determines the constants of the parameterized constraint optimization problem based on the bitrate-quality points across the convex hulls. More precisely, the encoding ladder application optionally normalizes the bitrates and quality scores of the bitrate-quality points to the same range (e.g., a common range) to generate normalized bitrates and normalized quality scores. The encoding ladder application organizes the resolutions, bitrates, quality scores, optional normalized bitrates, and optional normalized quality scores of the bitrate-quality points into arrays, where the indices of the arrays identify the corresponding bitrate-quality points.

The encoding ladder application defines the objective and constraints of the parameterized constrained optimization problem via a parameterized objective function and parameterized constraints. The parameterized objective function represents a weighted tradeoff between a weighted average of normalized quality scores across rungs of a candidate encoding ladder and the sum of normalized bitrates across the rungs. The number of rungs, the rung quality weights, and the tradeoff weights are parameters of the parameterized objective function. The parameterized constraints include both implicit logic constraints and practical logical constraints. Implicit logic constraints ensure the validity of candidate encoding ladders. For example, a monotonically increasing bitrate constraint ensures that the bitrates of encoded videos assigned to the rungs of a candidate encoding ladder monotonically increase from a lowest rug to a highest rung, Practical logical constraints capture operational restrictions and/or preferences that are associated with capabilities of client devices, network capacity, a CDN, human perception of visual quality, etc. For example, a parameterized bitrate spacing constraint ensures that bitrates of encoded videos assigned to the rungs of a candidate encoding ladder are separated by no more than a relative bitrate spacing.

The encoding ladder application generates multiple ladder configurations, where each ladder configuration is a different combination of values for the number of rungs, the rung quality weights, the tradeoff weights, and various parameters of the parameterized constraints (e.g., the relative bitrate spacing). For each ladder configuration, the encoding ladder application generates an objective function and associated constraints based on the parameterized objective function and the parameterized constraints, respectively. The encoding ladder application uses a constrained optimization algorithm to solve each of the objective functions subject to the associated constraints, thereby generating a different assignment matrix for each ladder configuration. Each assignment matrix specifies a different assignment of bitrate-quality points to each rung of a different candidate encoding ladder that can be used as an encoding ladder for the media title.

In some embodiments, a numerical evaluation application performs numerical evaluations of the candidate encoding ladders using throughput distributions and/or bitrate demand distributions corresponding to historical streaming sessions. The numerical evaluation application filters out any number (including zero) of candidate encoding ladders representing sub-par tradeoffs between streaming QoE and storage footprint to generate a filtered candidate encoding ladder set.

In some embodiments, a streaming evaluation application performs simulation-based evaluations of the candidate encoding ladders in the filtered candidate encoding ladder set. The streaming evaluation application generates a different synthetic streaming header for each of the candidate encoding ladders in the filtered candidate encoding ladder set based on encoded chunk metadata associated with the encoded videos specified in or estimated (e.g., based on a curve) for virtual encoded videos associated with the candidate encoding ladders. Metadata estimated for a virtual encoded video refers herein to metadata that is estimated for an encoded video that could potentially be generated based on the source video 102. The synthetic streaming header for a given candidate encoding ladder includes a different streaming metadata set for each run in the candidate encoding ladder. Each streaming metadata set specifies a sequence of encoded chunks for a corresponding encoded video or a corresponding virtual encoded video, the bitrates of the encoded chunks, and the quality scores of the encoded chunks.

The streaming evaluation application uses an adaptive streaming simulator to emulate the behavior of an ABR algorithm using each of the candidate encoding ladders and the corresponding encoded chunk metadata over multiple simulated streaming sessions characterized by different streaming session traces. Each streaming session trace specifies network throughput as a function of time for a different historical streaming session. The result of each simulation is a request sequence of encoded chunks of the media title. For each request sequence, the streaming evaluation application computes a different set of values for a set of metrics that are relevant to streaming QoE. The streaming evaluation application performs any number and/or types of comparison operations between the sets of values for the set of metrics to select the candidate encoding ladders from the filtered candidate encoding ladder set that represents the best streaming QoE to storage footprint tradeoff across the different simulated streaming sessions. As used herein, the "best streaming QoE to storage tradeoff" refers to a streaming QoE to storage tradeoff that most closely matches a target streaming QoE/storage footprint. The streaming evaluation application generates an encoding ladder for the media title based on the selected candidate encoding ladder.

At least one technical advantage of the disclosed techniques relative to the prior art is that, with the disclosed techniques, encoding ladders can be generated based on an overall objective of reducing the storage footprint of an encoding ladder while increasing the visual quality levels associated with the encoded videos included in the encoding ladder by concurrently accounting for different ladder constraints when generating the encoding ladder in the first instance. With such an approach, opportunities to use a single encoded video that satisfies multiple different ladder constraints can be identified and exploited when generating an encoding ladder, which improves the tradeoff between the weighted average of the visual quality levels associated with the encoded videos in the encoding ladder and the storage footprint of the encoding ladder. Consequently, the tradeoff between a streaming quality of experience represented by an encoding ladder for a given media title and the storage footprint of the encoding ladder can be substantially improved relative to what can be achieved using prior art techniques. These technical advantages provide one or more technological improvements over prior art approaches.

1. In some embodiments, a computer-implemented method for generating encoding ladders that are used to stream media titles comprises generating a first objective function based on a first ladder configuration and a parameterized objective function that approximates a tradeoff between a quality of experience and a cost term associated with a candidate encoding ladder; generating a first plurality of constraints based on the first ladder configuration and a plurality of parameterized constraints; and executing a constrained optimization algorithm on the first objective function, the first plurality of constraints, and encoding point metadata associated with a set of encoded videos to generate a first candidate encoding ladder for a media title.

2. The computer-implemented method of clause 1, wherein generating the first objective function comprises replacing a first parameter that is included in the parameterized objective function with a rung count specified in the first ladder configuration.

3. The computer-implemented method of clauses 1 or 2, wherein generating the first objective function comprises replacing one or more parameters included in the parameterized objective function with one or more parameter values that indicate a relative importance of the quality of experience and the cost term associated with the candidate encoding ladder.

4. The computer-implemented method of any of clauses 1-3, wherein generating the first plurality of constraints comprises replacing one or more parameters included in the first plurality of constraints with at least one of a rung count, a footprint upper bound, a high quality score, a minimum quality spacing, a maximum quality spacing, a low bitrate, or a relative bitrate spacing.

5. The computer-implemented method of any of clauses 1-4, further comprising determining different sets of parameter values for a union of a first set of parameters included in the parameterized objective function and a second set of parameters included in the plurality of parameterized constraints to generate the first ladder configuration and at least one other ladder configuration.

6. The computer-implemented method of any of clauses 1-5, wherein the encoding point metadata includes at least one of a set of resolutions, a set of quality scores, a set of bitrates, a set of normalized quality scores, or a set of normalized bitrates that are associated with the set of encoded videos.

7. The computer-implemented method of any of clauses 1-6, further comprising normalizing the set of bitrates and the set of quality scores to a common range to generate the set of normalized bitrates and the set of normalized quality scores.

8. The computer-implemented method of any of clauses 1-7, wherein a term included in the parameterized objective function comprises a weighted average of a subset of a set of normalized quality scores associated with the set of encoded videos.

9. The computer-implemented method of any of clauses 1-8, wherein the cost term is associated with at least one of a storage footprint or a network bandwidth consumption.

10. The computer-implemented method of any of clauses 1-9, wherein executing the constrained optimization algorithm comprises generating an assignment matrix specifying a plurality of assignments between the set of encoded videos and a plurality of rungs to be included in the first candidate encoding ladder.

11. In some embodiments, one or more non-transitory computer readable media include instructions that, when executed by one or more processors, cause the one or more processors to generate encoding ladders that are used to stream media titles by performing the steps of generating a first objective function based on a first ladder configuration and a parameterized objective function that approximates a tradeoff between a quality of experience and a cost term associated with a candidate encoding ladder; generating a first plurality of constraints based on the first ladder configuration and a plurality of parameterized constraints; and executing a constrained optimization algorithm on the first objective function, the first plurality of constraints, and encoding point metadata associated with a set of encoded videos to generate a first candidate encoding ladder for a media title.

12. The one or more non-transitory computer readable media of clause 11, wherein generating the first objective function comprises replacing a first parameter that is included in the parameterized objective function with a rung count specified in the first ladder configuration.

13. The one or more non-transitory computer readable media of clauses 11 or 12, wherein generating the first objective function comprises computing a plurality of values for a plurality of weights based on the first ladder configuration, wherein the plurality of weights are referenced by the first objective function and are associated with a plurality of rungs.

14. The one or more non-transitory computer readable media of any of clauses 11-13, wherein generating the first plurality of constraints comprises replacing one or more parameters included in the first plurality of constraints with at least one of a rung count, a footprint upper bound, a high quality score, a minimum quality spacing, a maximum quality spacing, a low bitrate, or a relative bitrate spacing.

15. The one or more non-transitory computer readable media of any of clauses 11-14, further comprising determining different sets of parameter values for a union of a first set of parameters included in the parameterized objective function and a second set of parameters included in the plurality of parameterized constraints to generate the first ladder configuration and at least one other ladder configuration.

16. The one or more non-transitory computer readable media of any of clauses 11-15, wherein the encoding point metadata includes at least one of a set of resolutions, a set of quality scores, a set of bitrates, a set of normalized quality scores, or a set of normalized bitrates that are associated with the set of encoded videos.

17. The one or more non-transitory computer readable media of any of clauses 11-16, wherein a term included in the parameterized objective function comprises an average of a subset of a set of normalized bitrates associated with the set of encoded videos.

18. The one or more non-transitory computer readable media of any of clauses 11-17, wherein the first plurality of constraints comprises at least one constraint associated with at least one resolution that the candidate encoding ladder represents.

19. The one or more non-transitory computer readable media of any of clauses 11-18, further comprising generating a second objective function based on a second ladder configuration and the parameterized objective function; generating a second plurality of constraints based on the second ladder configuration and the plurality of parameterized constraints; and executing the constrained optimization algorithm on the second objective function, the second plurality of constraints, and the encoding point metadata to generate a second candidate encoding ladder for the media title.

20. In some embodiments, a system comprises one or more memories storing instructions and one or more processors coupled to the one or more memories that, when executing the instructions, perform the steps of generating a first objective function based on a first ladder configuration and a parameterized objective function that approximates a tradeoff between a quality of experience and a cost term associated with a candidate encoding ladder; generating a first plurality of constraints based on the first ladder configuration and a plurality of parameterized constraints; and executing a constrained optimization algorithm on the first objective function, the first plurality of constraints, and encoding point metadata associated with a set of encoded videos to generate a first candidate encoding ladder for a media title.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.), or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating encoding ladders that are used to stream media titles, the method comprising:

generating a first quality of experience term for a candidate encoding ladder based on a combination of a plurality of quality of experience levels for a plurality of encoded videos associated with the candidate encoding ladder;

generating a first cost term for the candidate encoding ladder based on a combination of a plurality of cost levels for the plurality of encoded videos;

generating a first objective function based on a first ladder configuration and a parameterized objective function that approximates a tradeoff between a weighted quality of experience for the candidate encoding ladder and a weighted cost term for the candidate encoding ladder, wherein the weighted quality of experience is determined by weighting the first quality of experience term for the candidate encoding ladder using a quality term weight, and the weighted cost term is determined by weighting the first cost term for the candidate encoding ladder using a cost term weight that is different from the quality term weight;

generating a first plurality of constraints based on the first ladder configuration and a plurality of parameterized constraints; and executing a constrained optimization algorithm on the first objective function, the first plurality of constraints, and encoding point metadata associated with a set of encoded videos to generate a first candidate encoding ladder for a media title.

2. The computer-implemented method of claim 1, wherein generating the first objective function comprises replacing a first parameter that is included in the parameterized objective function with a rung count specified in the first ladder configuration.

3. The computer-implemented method of claim 1, wherein generating the first objective function comprises replacing one or more parameters included in the parameterized objective function with one or more parameter values that indicate a relative importance of the weighted quality of experience and the weighted cost term associated with the candidate encoding ladder.

4. The computer-implemented method of claim 1, wherein generating the first plurality of constraints comprises replacing one or more parameters included in the first plurality of constraints with at least one of a rung count, a footprint upper bound, a high quality score, a minimum quality spacing, a maximum quality spacing, a low bitrate, or a relative bitrate spacing.

5. The computer-implemented method of claim 1, further comprising determining different sets of parameter values for a union of a first set of parameters included in the parameterized objective function and a second set of parameters included in the plurality of parameterized constraints to generate the first ladder configuration and at least one other ladder configuration.

6. The computer-implemented method of claim 1, wherein the encoding point metadata includes at least one of a set of resolutions, a set of quality scores, a set of bitrates, a set of normalized quality scores, or a set of normalized bitrates that are associated with the set of encoded videos.

7. The computer-implemented method of claim 6, further comprising normalizing the set of bitrates and the set of quality scores to a common range to generate the set of normalized bitrates and the set of normalized quality scores.

8. The computer-implemented method of claim 1, wherein a term included in the parameterized objective function comprises a weighted average of a subset of a set of normalized quality scores associated with the set of encoded videos.

9. The computer-implemented method of claim 1, wherein the weighted cost term is associated with at least one of a storage footprint or a network bandwidth consumption.

10. The computer-implemented method of claim 1, wherein executing the constrained optimization algorithm comprises generating an assignment matrix specifying a plurality of assignments between the set of encoded videos and a plurality of rungs to be included in the first candidate encoding ladder.

11. One or more non-transitory computer readable media including instructions that, when executed by one or more processors, cause the one or more processors to generate encoding ladders that are used to stream media titles by performing the steps of:

generating a first quality of experience term for a candidate encoding ladder based on a combination of a plurality of quality of experience levels for a plurality of encoded videos associated with the candidate encoding ladder;

generating a first cost term for the candidate encoding ladder based on a combination of a plurality of cost levels for the plurality of encoded videos;

generating a first objective function based on a first ladder configuration and a parameterized objective function that approximates a tradeoff between a weighted quality of experience for the candidate encoding ladder and a weighted cost term for the candidate encoding ladder, wherein the weighted quality of experience is determined by weighting the first quality of experience term for the candidate encoding ladder using a quality term weight, and the weighted cost term is determined by weighting the first cost term for the candidate encoding ladder using a cost term weight that is different from the quality term weight;

generating a first plurality of constraints based on the first ladder configuration and a plurality of parameterized constraints; and executing a constrained optimization algorithm on the first objective function, the first plurality of constraints, and encoding point metadata associated with a set of encoded videos to generate a first candidate encoding ladder for a media title.

12. The one or more non-transitory computer readable media of claim 11, wherein generating the first objective function comprises replacing a first parameter that is included in the parameterized objective function with a rung count specified in the first ladder configuration.

13. The one or more non-transitory computer readable media of claim 11, wherein generating the first objective function comprises computing a plurality of values for a plurality of weights based on the first ladder configuration, wherein the plurality of weights are referenced by the first objective function and are associated with a plurality of rungs.

14. The one or more non-transitory computer readable media of claim 11, wherein generating the first plurality of constraints comprises replacing one or more parameters included in the first plurality of constraints with at least one of a rung count, a footprint upper bound, a high quality score, a minimum quality spacing, a maximum quality spacing, a low bitrate, or a relative bitrate spacing.

15. The one or more non-transitory computer readable media of claim 11, wherein the steps further include determining different sets of parameter values for a union of a first set of parameters included in the parameterized objective function and a second set of parameters included in the plurality of parameterized constraints to generate the first ladder configuration and at least one other ladder configuration.

16. The one or more non-transitory computer readable media of claim 11, wherein the encoding point metadata includes at least one of a set of resolutions, a set of quality scores, a set of bitrates, a set of normalized quality scores, or a set of normalized bitrates that are associated with the set of encoded videos.

17. The one or more non-transitory computer readable media of claim 11, wherein a term included in the parameterized objective function comprises a sum of a subset of a set of normalized bitrates associated with the set of encoded videos.

18. The one or more non-transitory computer readable media of claim 11, wherein the first plurality of constraints comprises at least one constraint associated with at least one resolution that the candidate encoding ladder represents.

19. The one or more non-transitory computer readable media of claim 11, wherein the steps further include:

generating a second objective function based on a second ladder configuration and the parameterized objective function;

generating a second plurality of constraints based on the second ladder configuration and the plurality of parameterized constraints; and executing the constrained optimization algorithm on the second objective function, the second plurality of constraints, and the encoding point metadata to generate a second candidate encoding ladder for the media title.

20. A system comprising:

one or more memories storing instructions; and one or more processors coupled to the one or more memories that, when executing the instructions, perform the steps of:

generating a first quality of experience term for a candidate encoding ladder based on a combination of a plurality of quality of experience levels for a plurality of encoded videos associated with the candidate encoding ladder;

generating a first cost term for the candidate encoding ladder based on a combination of a plurality of cost levels for the plurality of encoded videos;

generating a first objective function based on a first ladder configuration and a parameterized objective function that approximates a tradeoff between a weighted quality of experience for the candidate encoding ladder and a weighted cost term for the candidate encoding ladder, wherein the weighted quality of experience is determined by weighting the first quality of experience term for the candidate encoding ladder using a quality term weight, and the weighted cost term is determined by weighting the first cost term for the candidate encoding ladder using a cost term weight that is different from the quality term weight;

generating a first plurality of constraints based on the first ladder configuration and a plurality of parameterized constraints; and executing a constrained optimization algorithm on the first objective function, the first plurality of constraints, and encoding point metadata associated with a set of encoded videos to generate a first candidate encoding ladder for a media title.

21. The computer-implemented method of claim 1, wherein generating the first quality of experience term comprises determining a weighted combination of the plurality of quality of experience terms by applying a plurality of weighting factors to the plurality of quality of experience terms, wherein the quality term weight is different from the plurality of weighting factors.

* * * * *